(12) United States Patent
Kostas et al.

(10) Patent No.: US 11,658,708 B2
(45) Date of Patent: May 23, 2023

(54) CODEBOOK EMBEDDING GENERATION AND PROCESSING

(71) Applicant: QUALCOMM Incorporated, San Diego, CA (US)

(72) Inventors: Lindsey Makana Kostas, San Diego, CA (US); Ryan Michael Carey, Nashua, NH (US); Mihir Vijay Laghate, San Diego, CA (US); Lorenzo Ferrari, Oakland, CA (US); Yuan Gao, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/366,823

(22) Filed: Jul. 2, 2021

(65) Prior Publication Data

US 2023/0006718 A1 Jan. 5, 2023

(51) Int. Cl.
 *H04W 16/28* (2009.01)
 *H04B 7/0456* (2017.01)
 (Continued)

(52) U.S. Cl.
 CPC ............ *H04B 7/0456* (2013.01); *G06N 3/08* (2013.01); *H04L 5/0048* (2013.01); *H04W 16/28* (2013.01)

(58) Field of Classification Search
 CPC . H04W 48/16; H04W 72/12; H04W 74/0833; H04W 4/00; H04W 48/12;
 (Continued)

(56) References Cited

U.S. PATENT DOCUMENTS 10,305,553 B2 * 5/2019 O'Shea .................. G06N 3/088
2016/0274108 A1 * 9/2016 Yang .................... G01N 33/566
(Continued)

FOREIGN PATENT DOCUMENTS

| WO | 2017184190 A1 | 10/2017 |
| WO | 2021049986 A1 | 3/2021 |
| WO | 2021064238 A1 | 4/2021 |

OTHER PUBLICATIONS

International Search Report and Writtenn Opinion—PCT/US2022/073043—ISA/EPO—dated Oct. 12, 2022 (2102514WO).
(Continued)

*Primary Examiner* — Eva Y Puente
(74) *Attorney, Agent, or Firm* — Patterson + Sheridan, LLP

(57) ABSTRACT

Aspects of the present disclosure relate to wireless communication systems, and in particular, to techniques for generation and processing of an embedding representing a beam for communication. Certain aspects provide a method for wireless communication by a wireless node. The method generally includes receiving an embedding representing a characterization associated with a beam; providing the embedding to a machine learning (ML) model; generating one or more communication parameters for communication using the beam via the ML model based on the embedding; and communicating using the one or more communication parameters.

28 Claims, 18 Drawing Sheets

(51) Int. Cl.
*G06N 3/08* (2023.01)
*H04L 5/00* (2006.01)

(58) Field of Classification Search
CPC . H04W 60/04; H04W 74/02; H04W 74/0816; G06N 3/0454; G06N 3/08; G06N 3/0445; G06N 3/088; G06N 20/00; G06N 3/084; G06N 3/0472; G06N 3/0481; H04L 1/06; H04L 25/0391; H04L 27/20; H04L 1/0026; H04L 1/0041; H04L 1/0027; H04L 1/1607; H04L 1/18; H04L 1/1825
USPC .......................................................... 375/267
See application file for complete search history.

(56) References Cited

U.S. PATENT DOCUMENTS

| | | |
|---|---|---|
| 2019/0222275 A1 | 7/2019 | Mo et al. |
| 2019/0387463 A1 | 12/2019 | Raghavan et al. |
| 2020/0358512 A1 | 11/2020 | Zhan et al. |
| 2020/0366340 A1* | 11/2020 | Zhang ...................... G06N 3/08 |
| 2020/0389238 A1 | 12/2020 | Cai et al. |
| 2020/0389800 A1 | 12/2020 | Laghate et al. |
| 2021/0050890 A1 | 2/2021 | Park et al. |
| 2021/0058131 A1 | 2/2021 | Zhu et al. |
| 2021/0160149 A1* | 5/2021 | Ma ........................ H04W 76/10 |
| 2021/0266036 A1* | 8/2021 | Namgoong ........... G06K 9/6271 |
| 2022/0077878 A1* | 3/2022 | Husain ..................... H04K 3/25 |
| 2022/0113394 A1* | 4/2022 | Shin ....................... G01S 15/523 |

OTHER PUBLICATIONS

Mollel M.S., et al., "A Survey of Machine Learning Applications to Handover Management in 5G and Beyond," IEEE Access, IEEE, USA, vol. 9, Mar. 19, 2021, pp. 45770-45802, XP011846218, Section 4.

* cited by examiner

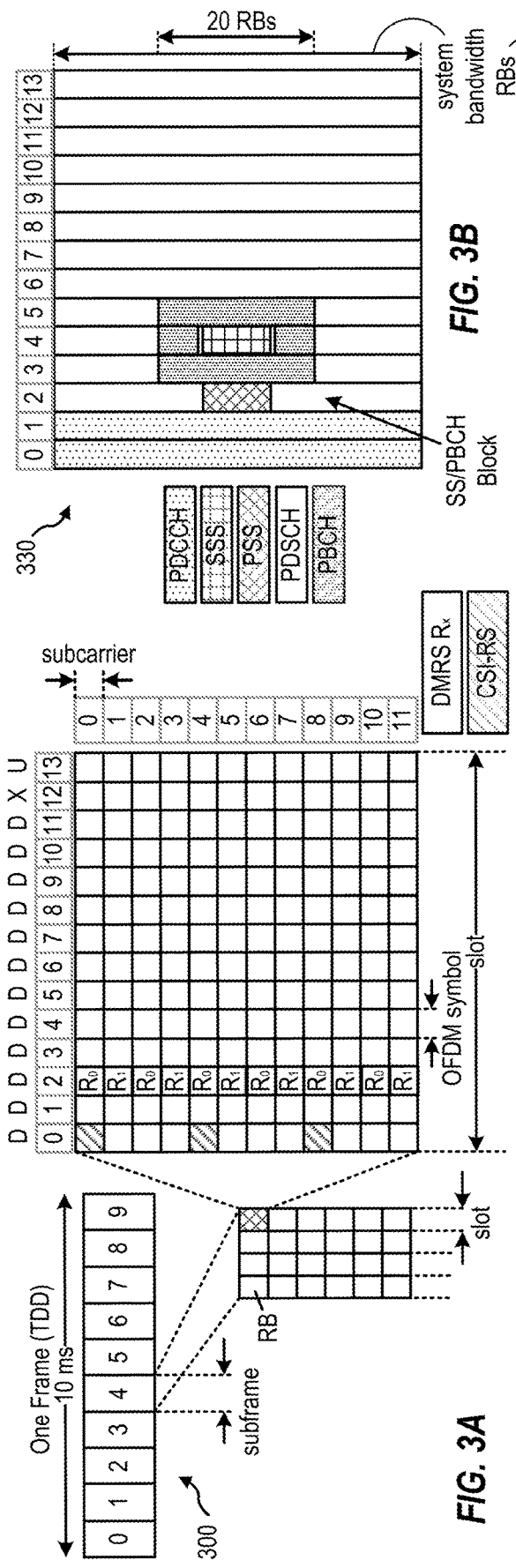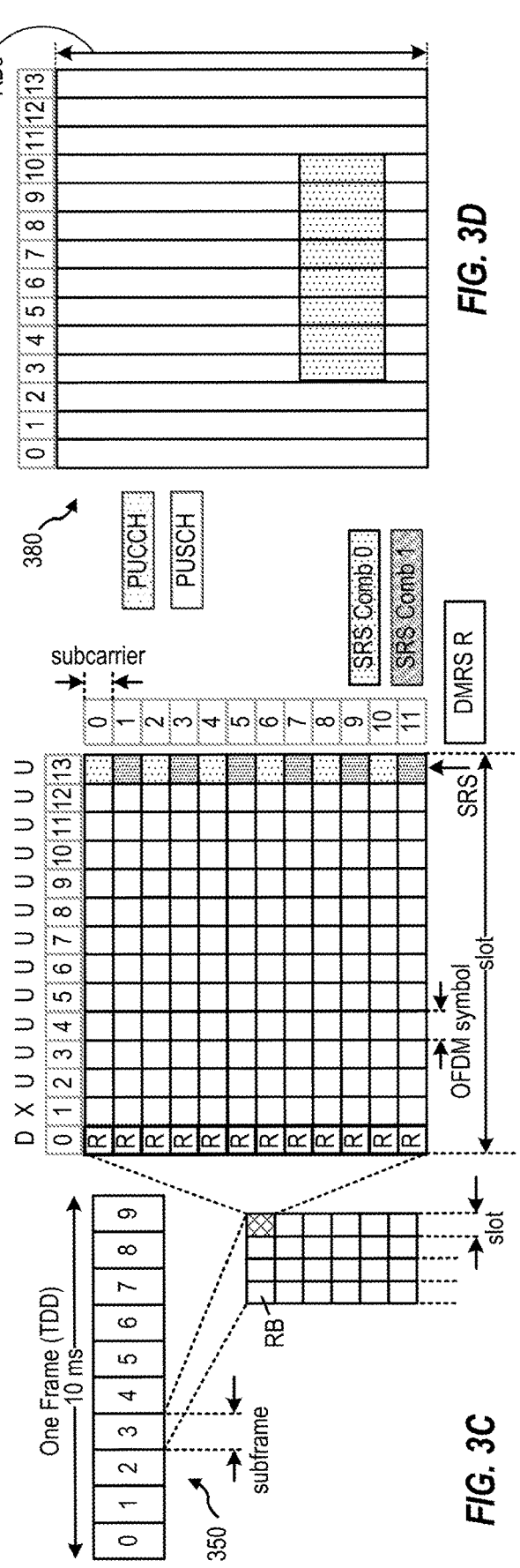

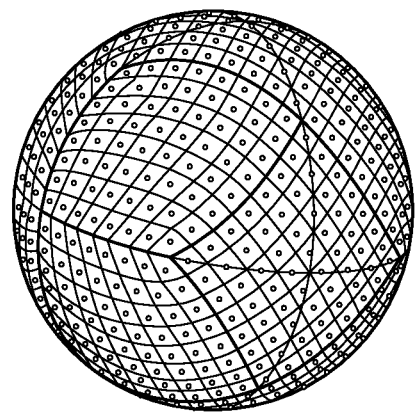
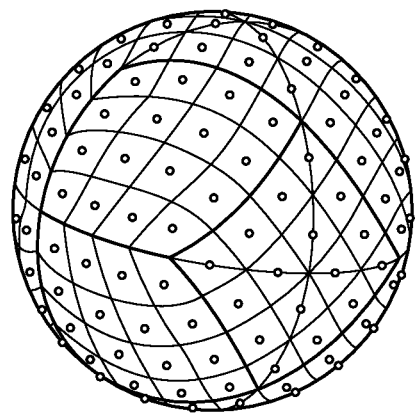
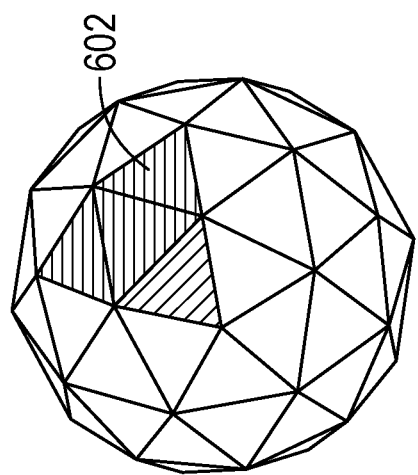
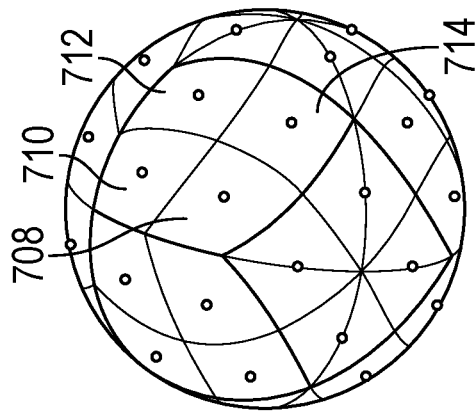
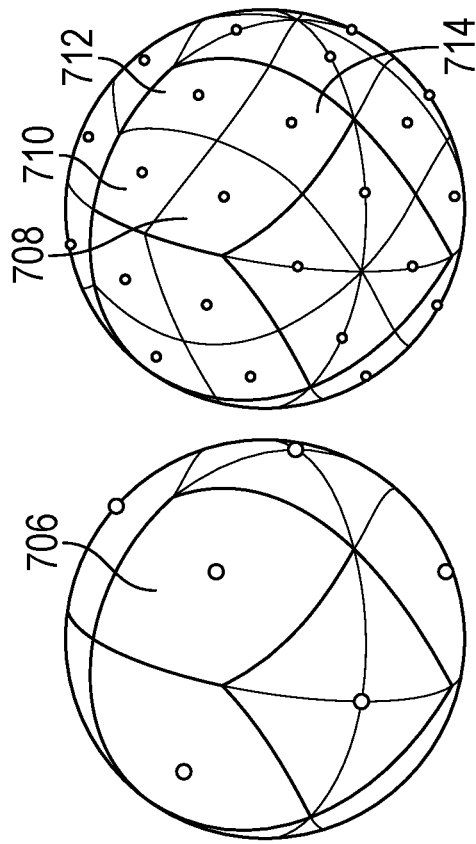
FIG. 6
FIG. 7

CODEBOOK EMBEDDING GENERATION AND PROCESSING

INTRODUCTION

Aspects of the present disclosure relate to wireless communication systems, and in particular, to techniques for generation and processing of an embedding representing a beam for communication.

Communications using "millimeter wave" ("mmW" or "mmWave") or near mmWave radio frequency band (e.g., 3 GHz-300 GHz) may have higher path loss and a shorter range compared to lower frequency communications. Accordingly, communications between a base station and a user equipment (UE) may use beamforming to improve path loss and range. To do so, the base station and the UE may each include multiple antennas, such as antenna elements, antenna panels, and/or antenna arrays to facilitate the beamforming.

A beam to be used for communication may be characterized using various techniques. One technique includes using an array gain sphere to represent a beam. An array gain sphere provides detailed information about the beam, but may be challenging to use when performing beam processing. Therefore, what is needed are techniques for representing a beam using a low-dimensional representation of the beam to facilitate efficient beam processing.

BRIEF SUMMARY

Certain aspects provide a method for wireless communication by a wireless node. The method generally includes receiving an embedding representing a characterization associated with a beam; providing the embedding to a machine learning (ML) model; generating one or more communication parameters for communication using the beam via the ML model based on the embedding; and communicating using the one or more communication parameters.

Certain aspects provide a method for wireless communication. The method generally includes receiving a characterization associated with a beam; generating an embedding based on the characterization; and providing the embedding to a wireless node.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict some aspects of the present disclosure and are therefore not to be considered limiting of the scope of this disclosure.

FIGS. 3A-3D depict aspects of data structures for a wireless communication network.

FIGS. 6, 7, and 8 illustrate example sampling techniques.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses and techniques for generating and processing an embedding representing a beam for communication. In some aspects of the present disclosure, an embedding representing a characterization of a beam may be generated by an encoder trained using an autoencoder training procedure. Once trained, the encoder may generate values for a look-up table indicating embeddings representing various beams. In some aspects, the characterization of the beam may be in the form of an array gain sphere. The array gain sphere data may be converted into a graph data structure, and the autoencoder training procedure may involve using a graphical convolution network to process the graph and train the encoder for generation of the values for the look-up table.

In some aspects, the look-up table may be provided to a user equipment (UE) for processing. For instance, a UE may retrieve, from the look-up table, an embedding representing a beam of interest and input the embedding into a machine learning model to generate a communication parameter to be used. As one example, the machine learning model may perform beam rotation, predict signal quality parameters (e.g., reference signal receive power (RSRP)) associated with the beam, calculate inter-beam similarities, performing mobility estimation, or perform codebook characterization, as described further herein.

Using an embedding as described herein results in reduced storage space and computation complexity at the UE by providing a low-dimensional representation of a beam that can be stored at the UE and used for performing computations. Generation of the embedding enables various evaluations (e.g., inter-beam similarity evaluation) from a single metric and provides a richer representation than conventional implementations that have codebook characterizations using descriptive statistics.

Introduction to Wireless Communication Networks

Figure 1:
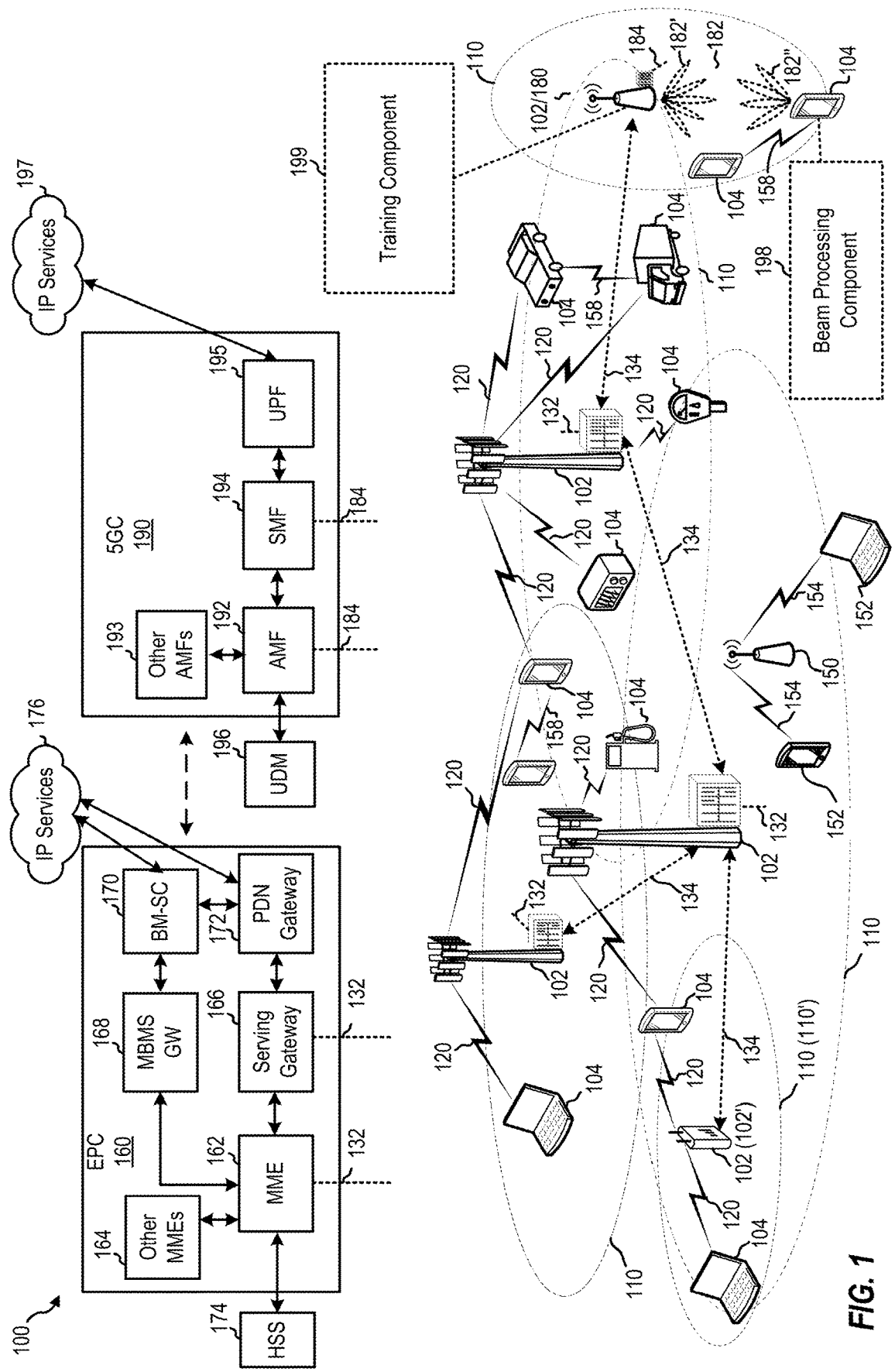
FIG. 1 depicts an example of a wireless communications system 100, in which aspects described herein may be implemented.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes training component 199, which may be configured to process characterization of a beam to generate an embedding. Wireless network 100 further includes beam processing component 198, which may be used configured to process an embedding using machine learning for communication.

Figure 2:
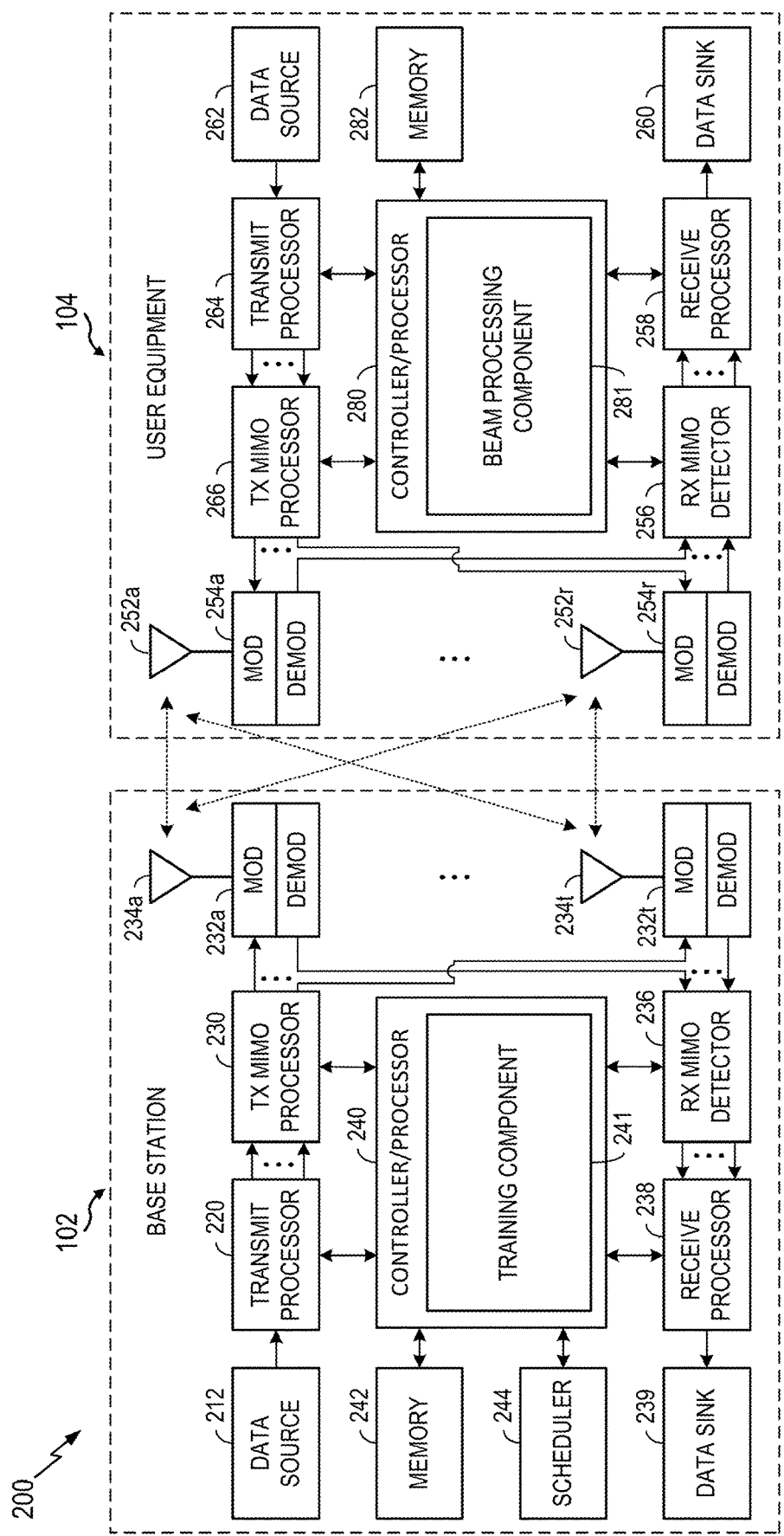
FIG. 2 depicts aspects of an example base station (BS) and a user equipment (UE).

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes training component 241, which may be representative of beam processing component 199 of FIG. 1. Notably, while depicted as an aspect of controller/processor 240, training component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes beam processing component 281, which may be representative of beam processing component 198 of FIG. 1. Notably, while depicted as an aspect of controller/processor 280, beam processing component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Example of Array Gain Sphere Processing Using Machine Learning (ML)

Machine Learning (ML) based approaches are becoming an increasingly attractive option for complex communication systems, including mmWave-enabled communication systems. Machine learning is generally the process of producing a trained model (e.g., an artificial neural network, a tree, or other structures), which represents a generalized fit to a set of training data that is known a priori. Applying the trained model to new data produces inferences, which may be used to gain insights into the new data. In some cases, applying the model to the new data is described as "running an inference" on the new data.

Both ML and non-ML mmWave applications use information that describe mmWave beams as an input to produce a target objective (e.g., schedule beams based on UE mobility). A codebook characterization provides a collection of different measures to describe individual beams and inter-beam relations. This set of information is currently obtained by empirical study and simulation. However, codebook characterization is not ideal, or practical, for consumption by downstream mmWave applications. Therefore, the performance of mmWave applications that rely on codebook beam characterization may be limited by the current representation of beams. Certain aspects of the present disclosure are directed to techniques for generating a low-dimension beam characterization (also referred to as "codebook embedding" or "embedding" for short), which can be used in arbitrary mmWave applications, codebook characterization, and beam analysis, to name a few examples.

A beam may be characterized using various techniques. For example, a beam may be represented by a beam ID, which is codebook specific. However, merely using a beam ID to characterize a beam may be insufficient as a general tool usable with arbitrary codebooks.

In some cases, beams may be characterized by defining parent-child-neighbor relationships of beams, providing a coarse characterization of the beams. A parent-child relationship between two beams may indicate a similarity in the features of the beams. However, using parent-child-neighbor relationships may be not provide a notion of relative closeness of beams.

Summary statistics of beams may be used for beam characterization. Summary statistics may be extracted from an array gain sphere which may be used to provide complete information regarding the beam. Summary statistics such as peak phi angle ($\varphi$), theta angle ($\theta$), and gain associated with the beam may result in two beams with very different profiles sharing a misleadingly similar representation.

Figure 4:
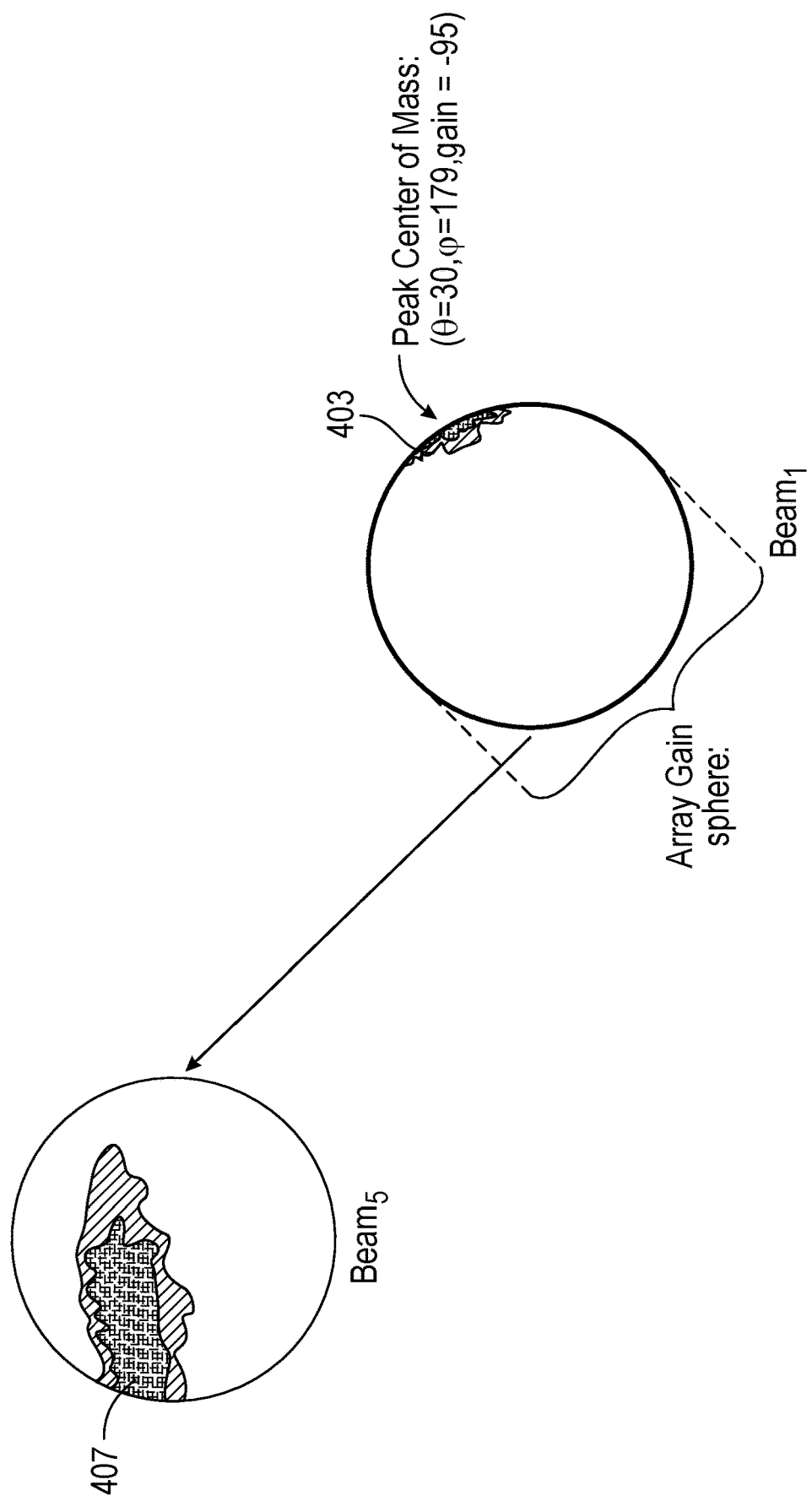
FIG. 4 illustrates example array gain spheres.

FIG. 4 illustrates example array gain spheres for various beams. Array gain spheres may be used to characterize multiple beams, such as $beam_1$ to $beam_5$, as shown. The array gain sphere indicates the gain associated with a beam at each phi and theta angle. The array gain sphere for $beam_1$ may have a peak center of mass at spherical coordinate 403 and the array gain sphere for $beam_5$ may have a peak center of mass at spherical coordinate 407. For instance, the peak center of mass for $beam_1$ may be at theta angle 30, phi angle 179, and have a gain of −95 dB.

While an array gain sphere provides detailed information of a beam, it may be difficult to use in practice for various applications—especially on user equipments and network elements not capable of generating the gain sphere data. Codebook characterization measures that work directly on the sphere, such as spherical cross-correlation, overlap ratio, and envelope, are approximations that do not capture non-0-lag relationships. Non-0-lag relationships are derived using non-0-lag analysis which provided an accurate representation of inter-beam relationships by considering different rotations associated with the array gain spheres by aligning the spheres on different coordinates, and performing a separate analysis for each rotation. Moreover, sphere projections to one-dimension (1D) or two-dimension (2D) representations may cause too many features for efficient processing, distortions, and/or discontinuities.

Some aspects of the present disclosure are directed to generating low-dimension beam characterization (e.g., capturing detailed information provided by a codebook characterization), which may be embodied in vector or other tensor data forms. The low-dimension beam characterization may also be referred to herein as an embedding. The embedding may be generated based on array gain measurements per UE beam on a sphere (e.g., an array gain sphere). In some cases, codebook beam characterization metrics per UE beam may be used as an auxiliary input for the generation of the embedding. The embedding may be used for determining relationships between beams, as an example. The embedding may be generated using a ML model trained using various types of processing units, including a graphical processing unit (GPU), central processing unit (CPU), neural processing unit (NPU), artificial intelligence (AI) accelerator, application specific integrated circuit (ASIC), or other processing units, any of which may be "off-target" (e.g., at a network entity such as a network server).

The embedding may then be generated using the trained ML model off-target (e.g., using a CPU at the network). For example, a look-up table may be generated indicating the embedding for each of multiple beam IDs. The look-up table may be sent to the target (e.g., a UE) to be used for performing various target tasks, such as evaluating inter-beam similarities, performing mobility estimation, and performing codebook characterization. The embedding may capture beam properties provided by the codebook characterization, such as width, strength, orientation, and peak gain, as a few examples. Using the embedding results in reduced storage space and computation complexity at the UE by providing a low-dimensional representation of a beam that can be stored at the UE and used for performing computations. In some aspects, the training of the ML model and generation of the look-up table may be performed on-target (e.g., at a UE).

Figure 5:
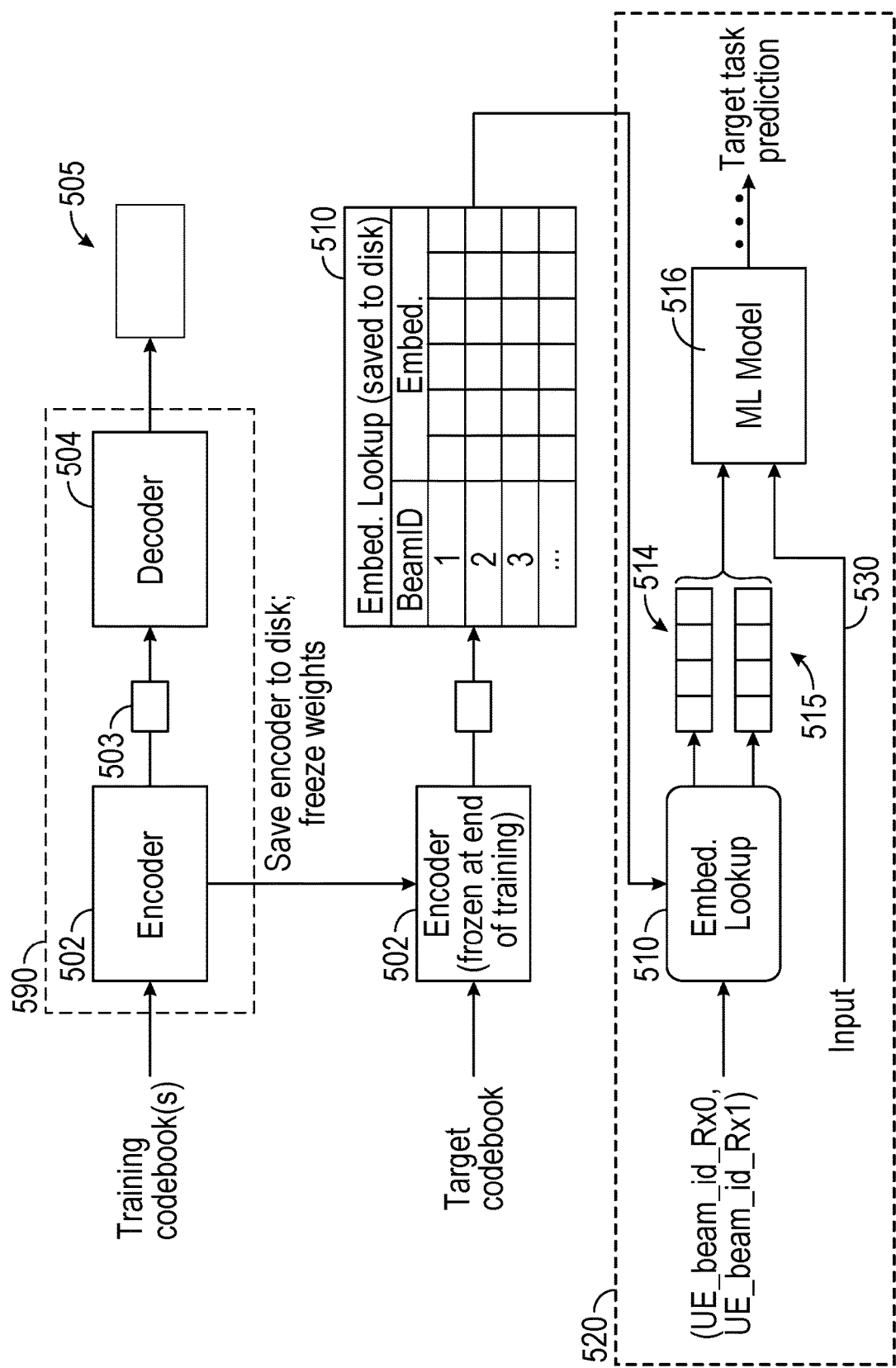
FIG. 5 illustrates example operations for embedding generation and processing, in accordance with certain aspects of the present disclosure.

FIG. 5 illustrates example operations for embedding generation and processing. In some aspects, an autoencoder technique may be used to implement an encoder for generation of embeddings.

An autoencoder is an artificial neural network used to learn efficient data encodings in an unsupervised manner. The aim of an autoencoder is to learn a representation (encoding) for a set of data by training the network to ignore signal "noise", in effect generating a lower dimensionality representation of an input. In some aspects, an autoencoder 590 may be trained end-to-end. The autoencoder 590 may include an encoder 502 that receives a representation of a beam (e.g., array gain sphere data) and generates a low-dimensional representation of the beam (e.g., an embedding 503). The autoencoder 590 may further include a decoder 504 that attempts to reconstruct the representation of the beam.

In other words, the encoder 502 (also referred to as an embedding generator) may be used to learn efficient encodings to generate the embedding 503 based on one or more training codebooks. In some aspects, target task optimization (or at least improvement) of the embedding may be performed. For instance, the embedding is provided to the decoder 504 to reconstruct (e.g., generate) an output 505 for training by optimizing (or at least improving) an objective function (e.g., by comparing the output from the decoder with the input to the encoder and adjusting weights of the autoencoder accordingly).

Once the autoencoder has been trained, the encoder 502 may be used separately for other tasks, such as generating encodings, without using the decoding aspect of the autoencoder model. For example, the encoder 502 may receive a target codebook to generate data for a look-up table 510, including an embedding for each beam ID, as shown. The autoencoder training operations and look-up table generation may be performed off-target (e.g., on a server at a network). The look-up table may be then saved and provided to a target 520 (e.g., a UE) for performing a target task.

For instance, the UE may determine embeddings 514 and 515 associated with two beams, respectively (e.g., labeled as UE_beam_id_Rx0 and UE_beam_id_Rx1 in FIG. 5) using the look-up table 510. The embeddings 514 and 515 may be provided to an ML model 516 to perform a target task, such as a prediction relevant to a communication connection between the target (e.g., UE) and the network. The target task may be performed based on data input 530 as described in more detail herein.

Certain aspects of the present disclosure are directed to techniques for converting an array gain sphere (or array gain sphere data) to an embedding using a graphical convolution network (GCN). A GCN is a type of graph neural network designed to perform inference on data structured as graphs. For example, a graph neural network may be applied directly to a graph to perform node-level, edge-level, and graph-level prediction tasks. A graph may generally have multiple nodes (e.g., vertices) and edges (e.g., connections between the vertices) that represent the relationship of one node with another. For example, an edge may be associated with a weight that may indicate importance or cost associated with the edge.

To implement a GCN, an array gain sphere may be first converted into a graph data format. Various suitable techniques may be used map the array gain sphere to a graph. For example, each node of the graph may be mapped to a coordinate (e.g., a phi and theta angle coordinates) on the array gain sphere. Other techniques may include using an icosahedron sampling of the sphere or a Hierarchical Equal Area isoLatitude Pixelization (HEALPix) technique, as described in more detail with respect to FIGS. 6, 7, and 8.

Figure 8:
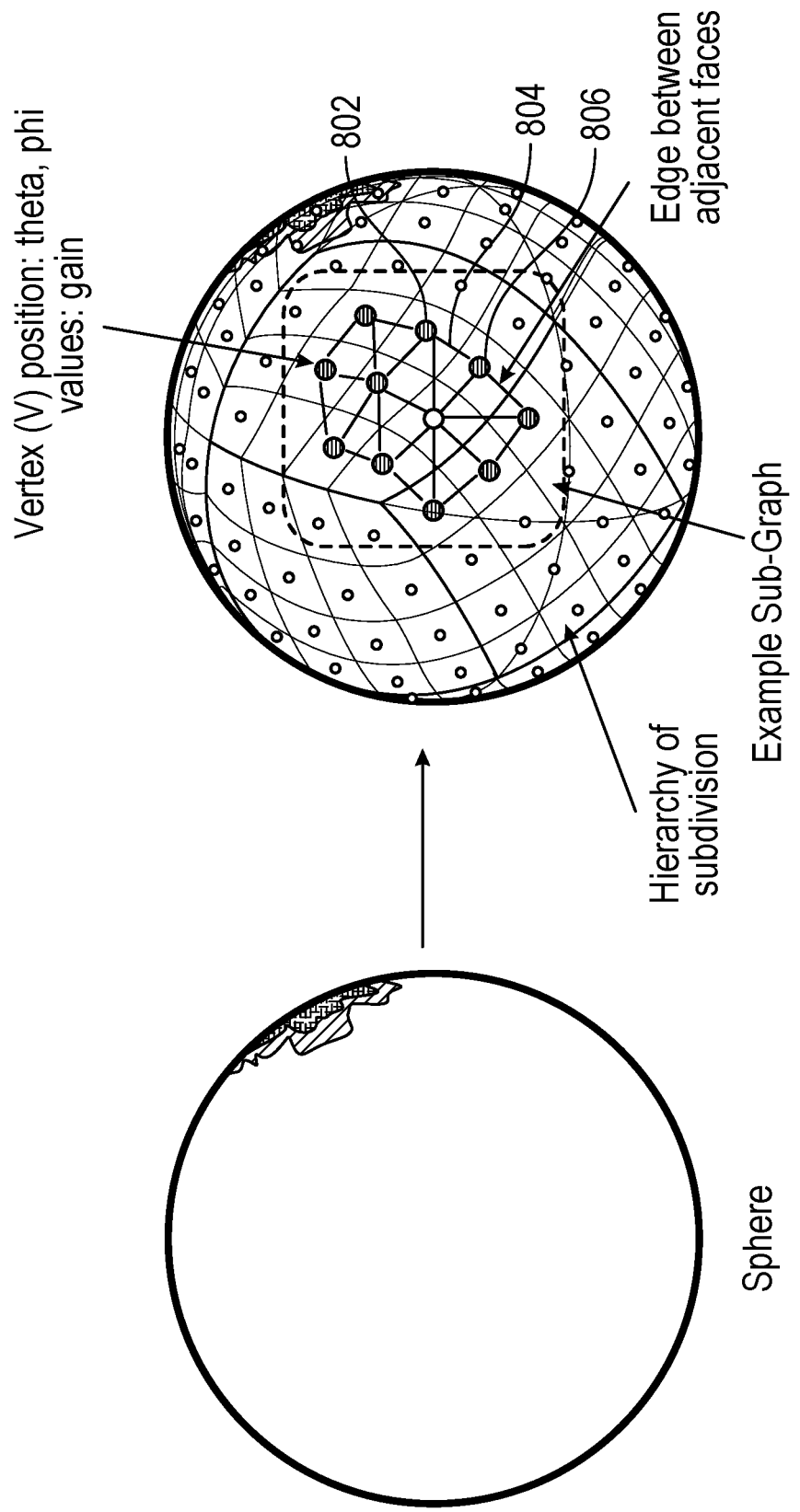

FIGS. 6, 7, and 8 illustrate example sampling techniques for mapping data to a graph data structure.

For example, FIG. 6 illustrates an icosahedron sampling technique. As shown, an array gain sphere may be divided into sets of equilateral triangles. Each node in the graph may be mapped to a vertex of one of the triangles (e.g., vertex of triangle 602).

FIG. 7 illustrates a HEALPix technique. As shown, the array gain sphere may be divided into hierarchies of equal area curvilinear quadrilaterals. Each quadrilateral may be further divided into multiple quadrilaterals in a hierarchical manner. For example, quadrilateral 706 may be divided into quadrilaterals 708, 710, 712, 714, and each of the quadrilaterals 708, 710, 712, 714 may be further divided in smaller quadrilaterals and so on, as shown.

The original array gain sphere may be interpolated from codebook phi and theta angle points to discretized points. As shown in FIG. 8, the points on the sphere may be then transformed into a set of nodes (e.g., vertex (V) such as vertex 802) and edges (E) (e.g., edge 804), which define a graph G(V,E). For example, when using the HEALPix technique, the sphere may include a total of 196,608 points for an order-7 discretization in accordance with the equation:

$$|V|=12\times 4^{order},$$

where |V| is the total number of points. The order of the differential equation used to define |V| may be 7 for an order-7 discretization. In the example of FIG. 8, graph edges are defined between a node and each node of the set of adjacent faces (e.g., quadrilaterals). Nodes are defined as the centroid of each face (e.g., quadrilateral). Edge 804 may be defined between vertex 802 and vertex 806. Once the array gain sphere is mapped to a graph, the graph may be fed into one or more graphical convolution networks (GCNs) for generation of the embedding, as described in more detail with respect to FIG. 9.

Figure 9:
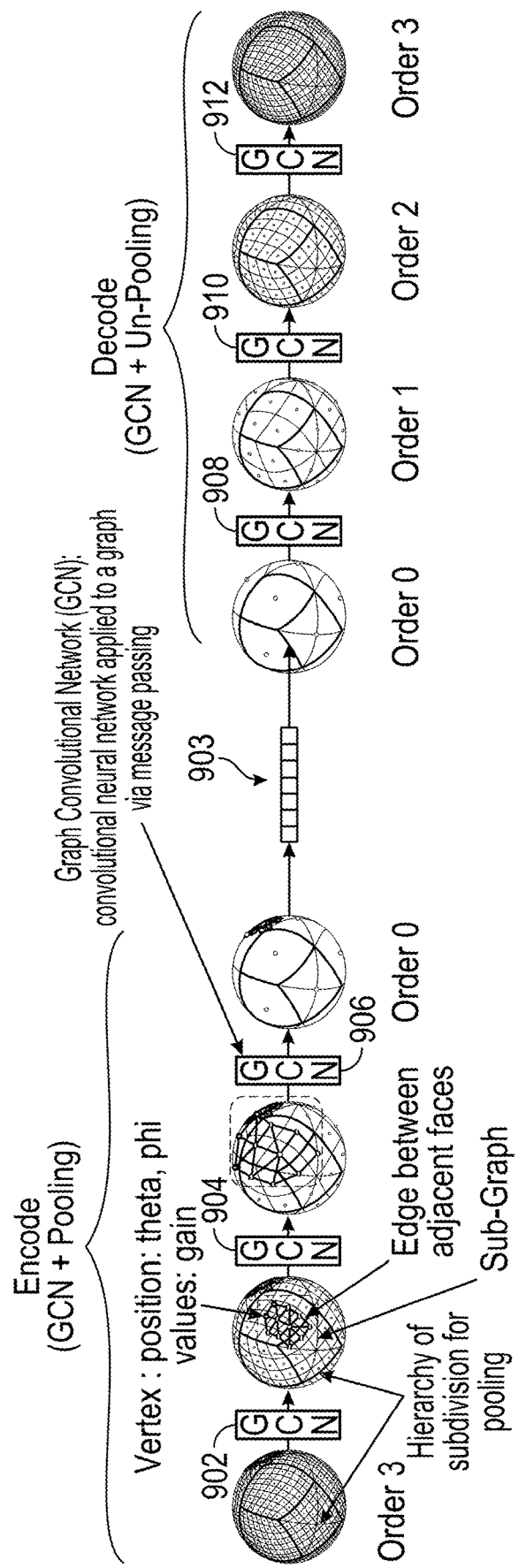
FIG. 9 illustrates an example technique for training an autoencoder using a graphical convolution network (GCN), in accordance with certain aspects of the present disclosure.

FIG. 9 illustrates an example technique for implementing an autoencoder using a graphical convolution network (GCN), in accordance with certain aspects of the present disclosure. As described, an array gain sphere (or array gain sphere data) may be converted into a graph and provided to a GCN to generate an embedding. For example, the graph may be processed by GCN 902, GCN 904, GCN 906 to coarsen the graph and generate the embedding 903, as shown. In other words, GCN 902 may convert an order 3 graph to an order 2 graph (e.g., representing an order-3 discretization), GCN 904 may convert the order 2 graph (e.g., representing an order-2 discretization) to an order 1 graph (e.g., representing an order-1 discretization), and GCN 906 may convert the order 1 graph to order 0 graph. The order 0 graph may be used to generate the embedding 503. The embedding 903 is provided to a decoder implemented using GCN 908, GCN 910, GCN 912 to reconstruct the input (the input to GCN 902). The GCNs 908, 910, 912 construct more detailed graphs. For example, the GCN 908 converts an order 0 graph to an order 1 graph, GCN 910 converts an order 1 graph to an order 2 graph, and GCN 912 converts an order 2 graph to an order 3 graph, as so on.

Figure 10:
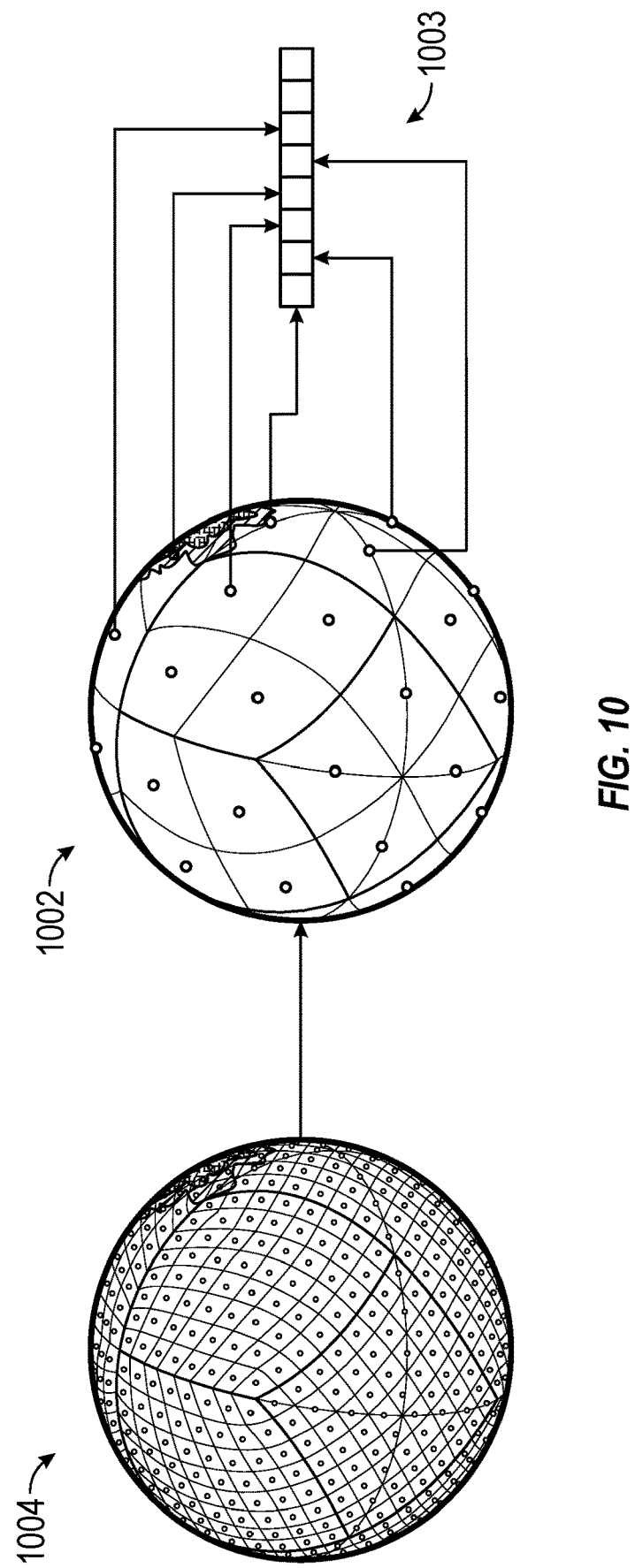
FIG. 10 illustrates generation of an embedding from a discretized sphere, in accordance with certain aspects of the present disclosure.

FIG. 10 illustrates the generation of an embedding 1003 from a discretized sphere, in accordance with certain aspects of the present disclosure. As described, an array gain sphere may be discretized using a technique such as the HEALPix technique to generate the discretized sphere 1004 and coarsened to generate the coarsened discretized sphere 1002. The discretized sphere 1002 may be flattened into a 1D vector to generate the embedding 1003, as shown. For example, the vertex of each of quadrilaterals on the coarsened discretized sphere 1002 may be used to generate the embedding 1003.

Figure 11:
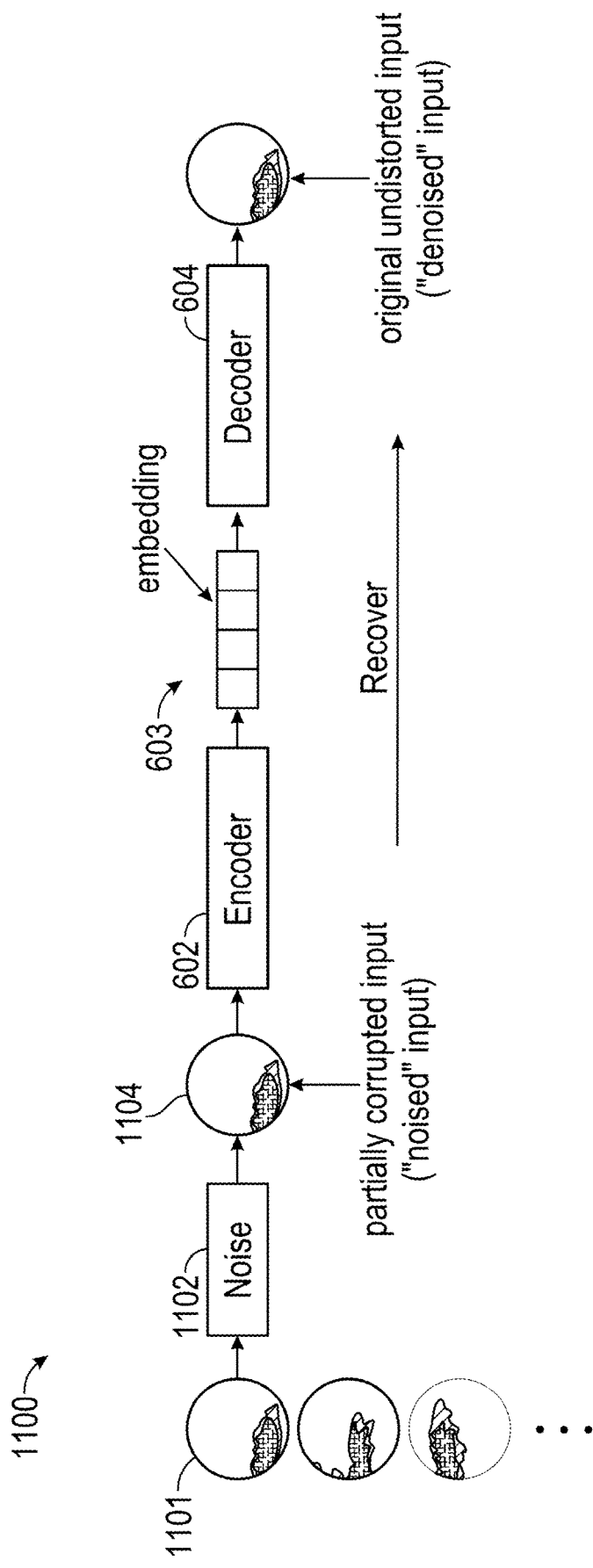
FIG. 11 illustrates a denoising autoencoder, in accordance with certain aspects of the present disclosure.

FIG. 11 illustrates a denoising autoencoder 1100 (e.g., corresponding to autoencoder 590 of FIG. 5), in accordance with certain aspects of the present disclosure. The addition of noise to a data input has a regularization effect and, in turn, improves the robustness of an ML model. As shown, at block 1102, noise may be added to the array gain sphere 1101 to generate a partially corrupted input 1104 (also referred to herein as a noise augmented input). The partially corrupted input 1104 may be provided to the encoder 502 to generate the embedding, as described herein. The embedding 503 may be provided to the decoder 504 to recover the original uncorrupted input (e.g., array gain sphere 1101).

Figure 12:
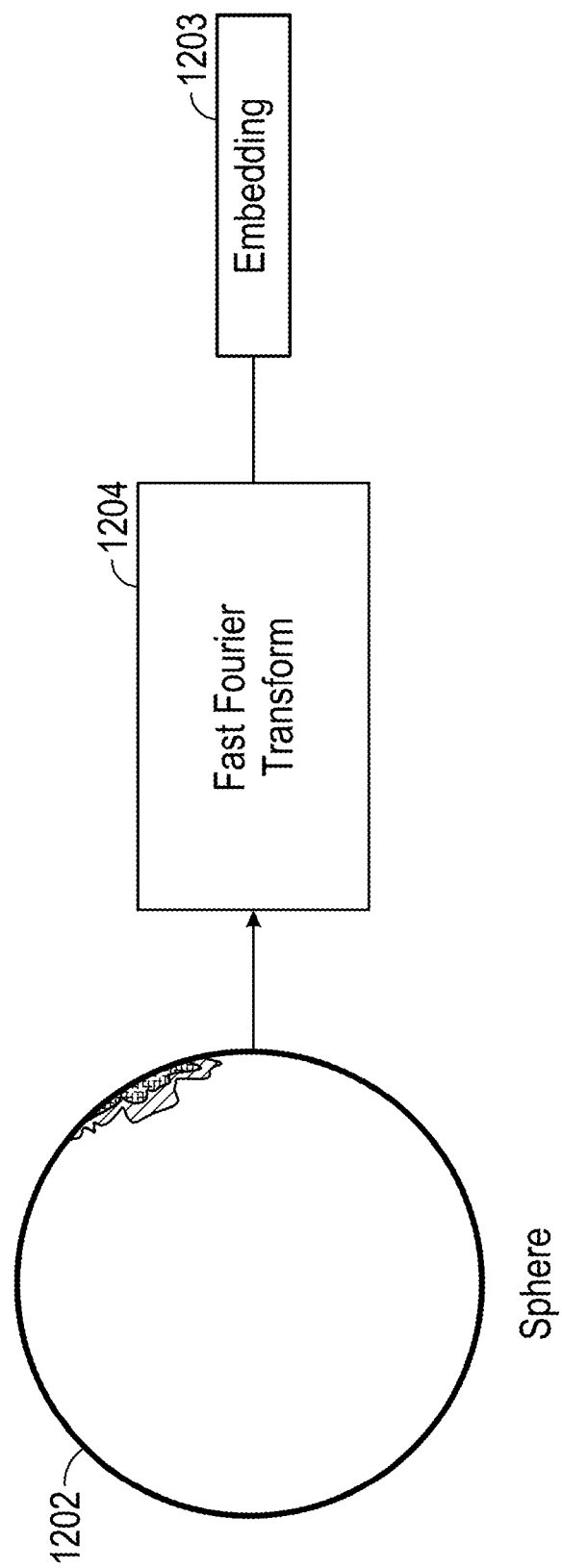
FIG. 12 illustrates techniques for generating an embedding using a Fourier transform, in accordance with certain aspects of the present disclosure.

FIG. 12 illustrates techniques for generating an embedding using a Fourier transform in accordance with certain aspects of the present disclosure. For example, a 2D Fourier transform of the beam gain from the phi, theta domain to Fourier domain may be performed.

In the depicted example, the phi and theta angle points from the array gain sphere 1202 are input to a Fourier transform block 1204 to generate the embedding 503. For instance, the Fourier coefficients as a 1D vector may be used as the embedding 1203. The Fourier domain captures dominant energy in a small set of points, and therefore, generates a compressed representation of the array gain sphere 1202. The rotation in phi and theta domain may be represented as phase rotation in the Fourier domain. The Fourier transform retains rotation information which may be useful in downstream tasks such as rotation estimation. Thus, this is an alternative to using an autoencoder, as described above, to generate the low-dimension representation of the array gain sphere 1202 data.

Techniques for Array Gain Sphere Data Processing

Certain aspects of the present disclosure are directed to techniques for processing array gain sphere data using an embedding look-up table generated using a trained encoder, for example, as described with respect to FIG. 5. The array gain sphere may be processed to perform any suitable target task, such as beam rotation, beam comparison, and received signal received power (RSRP) prediction, to name just a few.

Figure 13:
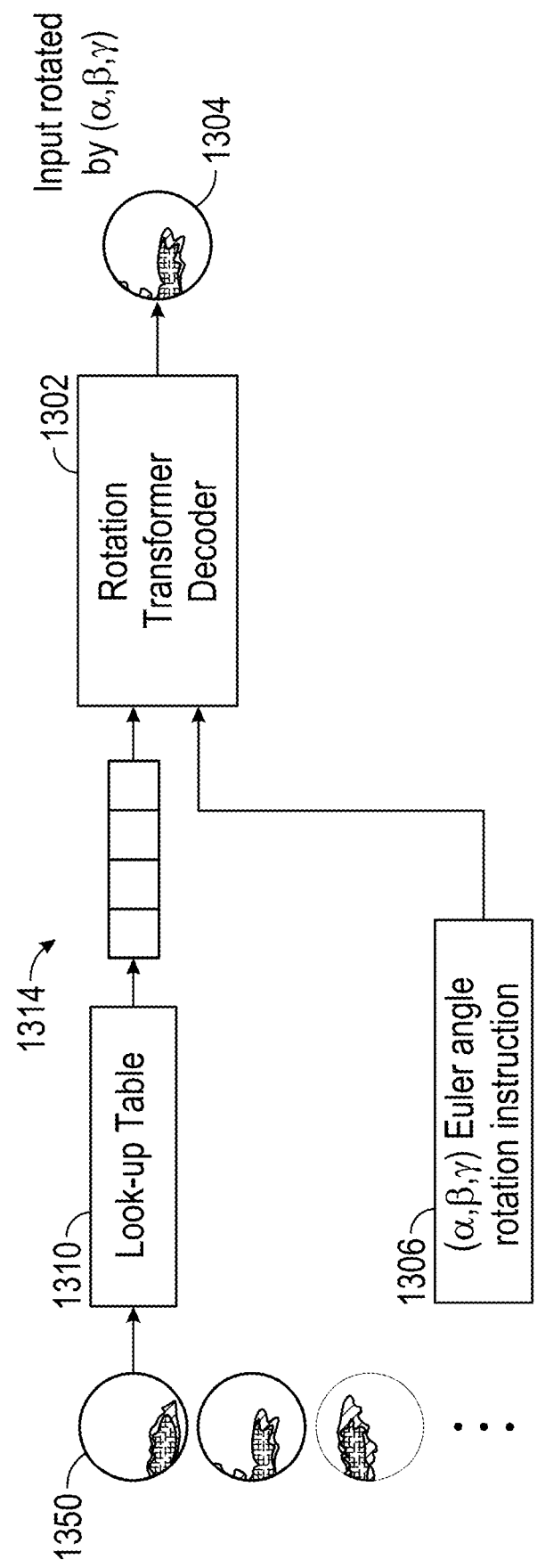
FIG. 13 illustrates example operations for beam rotation in accordance with certain aspects of the present disclosure.

FIG. 13 illustrates example operations for performing beam rotation in accordance with certain aspects of the present disclosure. As described with respect to FIG. 5, the encoder 502 may be used to generate values for an embedding look-up table 510 indicating embeddings for one or more beams. The look-up table is then provided to a UE. In the depicted example, a UE may use look-up table 1310 to determine an embedding 1314 for a specific beam (e.g., represented by array gain sphere 1350). As shown, the embedding 1314 may be provided to a rotation transformer decoder 1302 (e.g., an example of ML model 516 of FIG. 5). The rotation transformer decoder 1302 may receive an angle rotation instruction 1306, indicating the angles (e.g., Euler angles) by which the input array gain sphere is to be rotated. The rotation transformer decoder 1302 then generates array gain sphere 1304 as rotated in accordance with the angle rotation instruction 1306. The UE may use the rotated array gain sphere to facilitate communications with other nodes.

Figure 14:
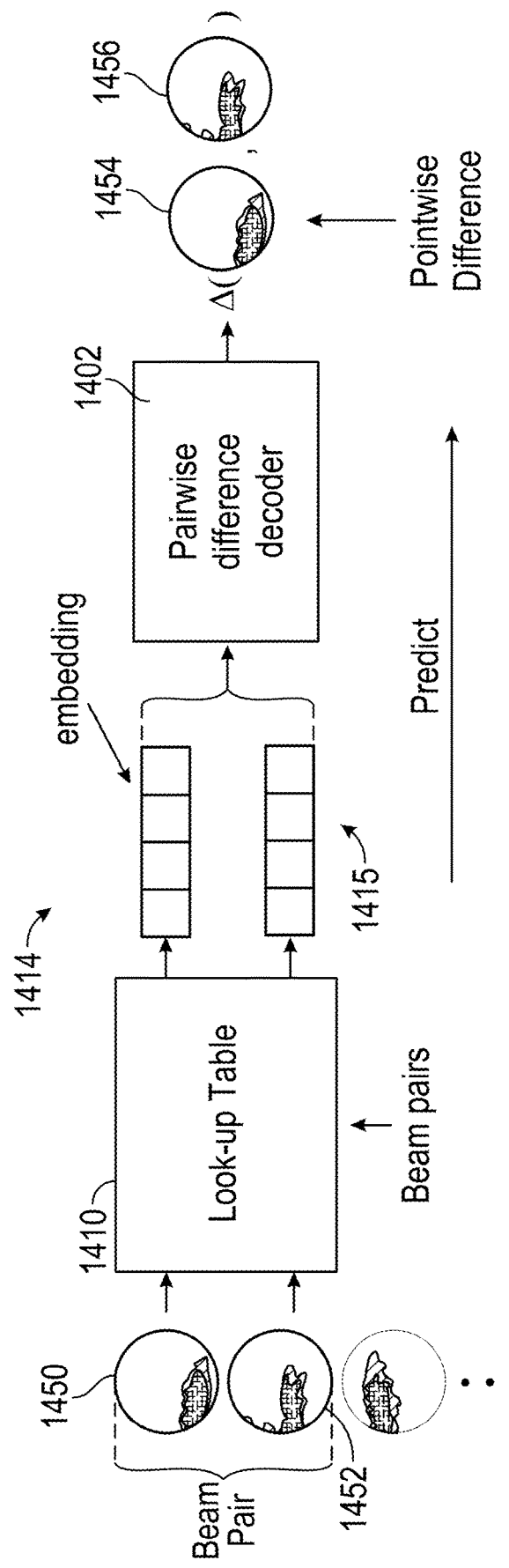
FIG. 14 illustrates example operations for beam comparison, in accordance with certain aspects of the present disclosure.

FIG. 14 illustrates example operations for beam comparison in accordance with certain aspects of the present disclosure. As shown, embedding 1414 and embedding 1415 associated with two beams (e.g., characterized by array gain spheres 1450 and 1452) may be generated and provided to a pairwise difference decoder 1402 (e.g., another example of ML model 516 of FIG. 5) to generate a pointwise difference parameter indicating the difference between the two beams (e.g., the difference between the array gain spheres 1454, 1456). The UE may use the pointwise difference parameter to facilitate communications with other nodes.

Figure 15:
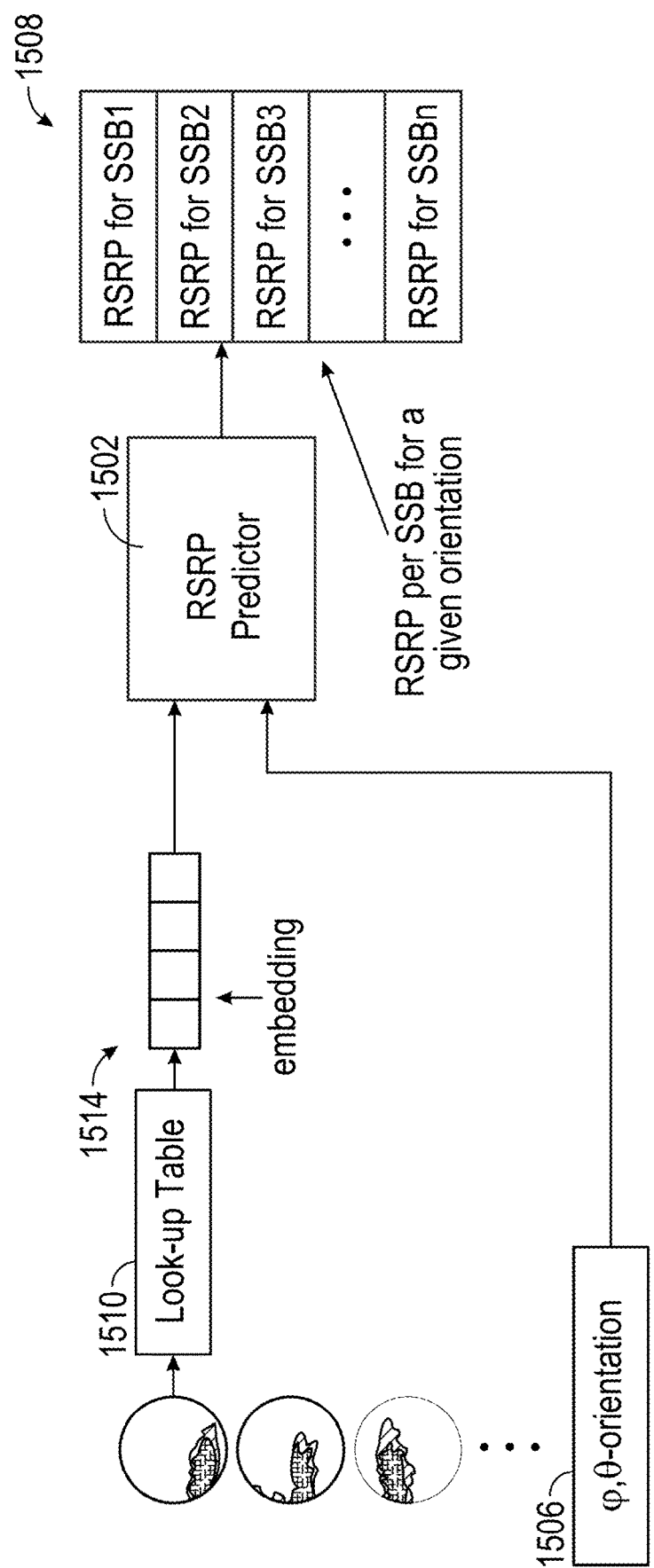
FIG. 15 illustrates example operations for signal quality prediction, in accordance with certain aspects of the present disclosure.

FIG. 15 illustrates example operations for RSRP prediction in accordance with certain aspects of the present disclosure. In one example, UE RSRP may be predicated per synchronization signal block (SSB) based on a beam embedding and UE orientation. For example, the embedding 1514 may be provided to an RSRP predictor 1502 (e.g., another example of ML model 516 of FIG. 5). The RSRP predictor 1502 may receive an indication of an orientation 1506 of the UE. The RSRP predictor 1502 may then determine (e.g., predict) an RSRP (e.g., each of RSRPs 1508) for each of multiple synchronization signal blocks (SSBs) (e.g., SSB1 to SSBn, n being an integer greater than 1) for the given orientation 1506.

In some aspects, a characterization of a beam (e.g., representing an array gain sphere such as array gain spheres 1350, 1450, 1452) may be provided to an encoder (e.g., encoder 602) to facilitate training of the encoder for generation of embeddings. For example, a UE may provide the characterization of the beam to an encoder locally at the UE (or at a BS), which may be used for training or tuning the encoder (e.g., facilitating full end-to-end learning/fine-tuning of the encoder to improve embedding generation).

Example Signal Processing Flow for Data Reuse

Figure 16:
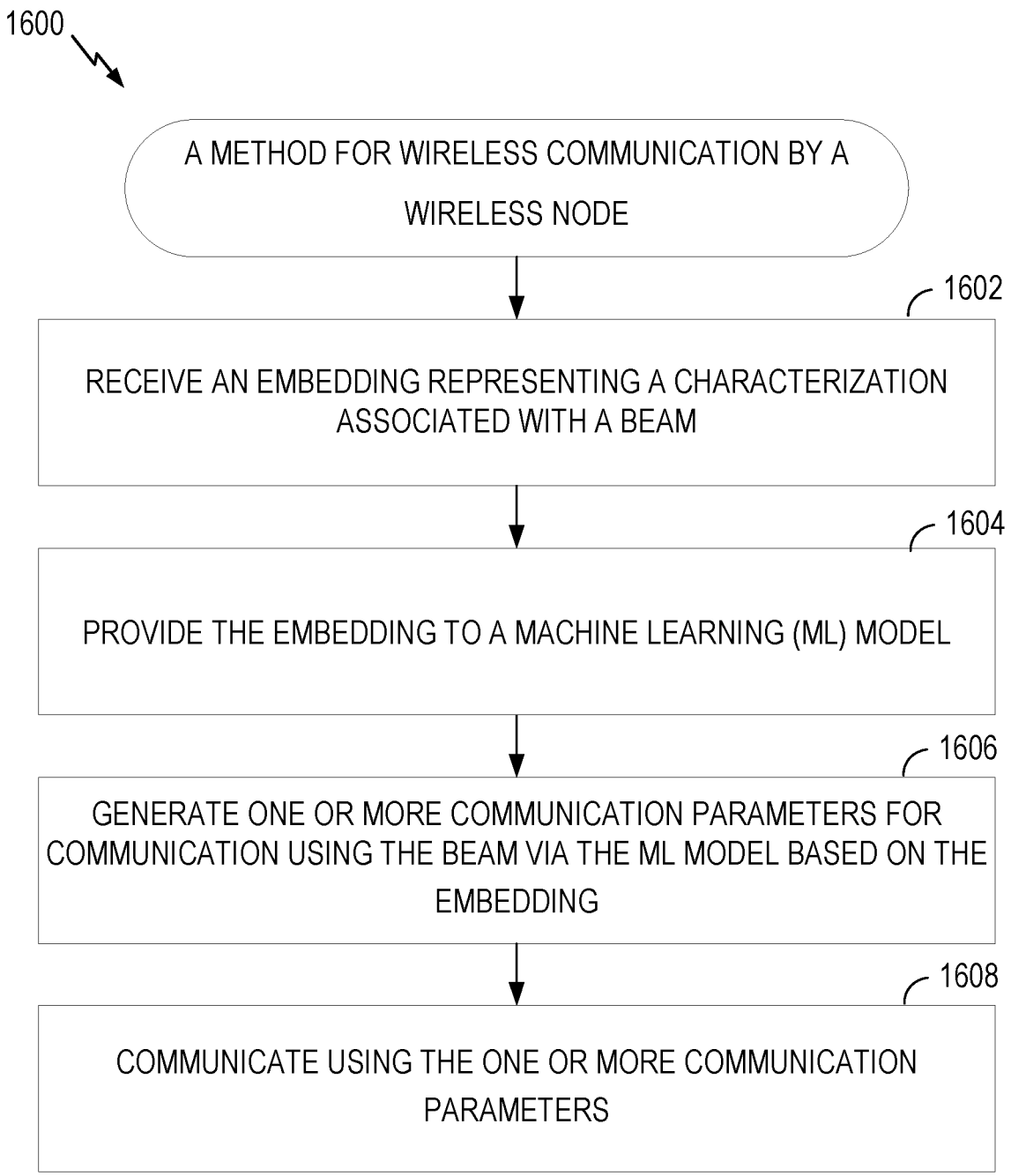
FIG. 16 is a flow diagram illustrating example operations for wireless communication by a target entity, in accordance with certain aspects of the present disclosure.

FIG. 16 is a flow diagram illustrating example operations 1600 for wireless communication, in accordance with certain aspects of the present disclosure. The operations 1600 may be performed, for example, by a wireless node such as a UE (e.g., a UE 104 in the wireless communication network 100 of FIG. 1).

Operations 1600 may be implemented as software components that are executed and run on one or more processors (e.g., controller/processor 280 of FIG. 2). Further, the transmission and reception of signals by the UE in operations 1600 may be enabled, for example, by one or more antennas (e.g., antennas 252 of FIG. 2). In certain aspects, the transmission and/or reception of signals by the UE may be implemented via a bus interface of one or more processors (e.g., controller/processor 280 or beam processing component 281 of FIG. 2) obtaining and/or outputting signals.

The operations 1600 begin, at block 1602, with the wireless node receiving (e.g., from the network) an embedding (e.g., embedding 514 of FIG. 5) representing a characterization associated with a beam. In some aspects, receiving the embedding may include receiving a look-up table (e.g., look-up table 510 of FIG. 5) including an indication of the embedding). The characterization may include spherical array gain data, array gain measurements, or codebook beam characterization metrics, to name a few examples.

At block 1604, the wireless node may provide the embedding to a machine learning (ML) model (e.g., ML model 516 of FIG. 5).

At block 1606, the wireless node may generate one or more communication parameters for communication using the beam via the ML model based on the embedding. For instance, the ML model may be a rotation transformer decoder (e.g., rotation transformer decoder 1302 of FIG. 13). In this case, generating the one or more communication parameters may include determining, via the rotation transformer decoder, a rotation of the beam for the communication based on the embedding. For example, the one or more communication parameters may include a rotated beam in accordance with the determination. In some aspects, the wireless node may provide a rotation instruction (e.g., rotation instruction 1306 of FIG. 13) to the rotation transformer decoder, and the rotation of the beam may be determined based on the rotation instruction.

In some aspects, the wireless node may generate another embedding (e.g., embedding 1415 of FIG. 14) based on a characterization of another beam (e.g., array gain sphere 1452 of FIG. 14). The embedding (e.g., embedding 1414 of FIG. 14) and the other embedding (e.g., embedding 1415 of FIG. 14) are provided to a pointwise difference decoder (e.g., pointwise difference decoder 1402 of FIG. 14). The wireless node then generates the one or more communication parameters by predicting a pointwise difference between the beam and the other beam based on the embedding and the other embedding via the pointwise difference decoder.

In some aspects, the embedding (e.g., embedding 1514 of FIG. 15) is provided to a reference signal receive power (RSRP) decoder (e.g., RSRP predictor 1502 of FIG. 15). The wireless node may generate the one or more communication parameters by determining, via the RSRP decoder, an RSRP (e.g., each of RSRPs 1508 of FIG. 15) for each of multiple synchronization signal blocks (SSBs) based on the embedding. In some aspects, the wireless node may provide an indication of an orientation (e.g., orientation 1506 of FIG. 15) of the wireless node, the RSRP being determined based on the orientation.

At block 1608, the wireless node may communicate using the one or more communication parameters.

In some aspects, the beam characterization may be input to an encoder (e.g., encoder 602) to facilitate training of the encoder for generation of embeddings. For example, a UE may provide the characterization of the beam to an encoder locally at the UE (or at a BS), which may be used for training or tuning of the encoder to improve embedding generation.

Figure 17:
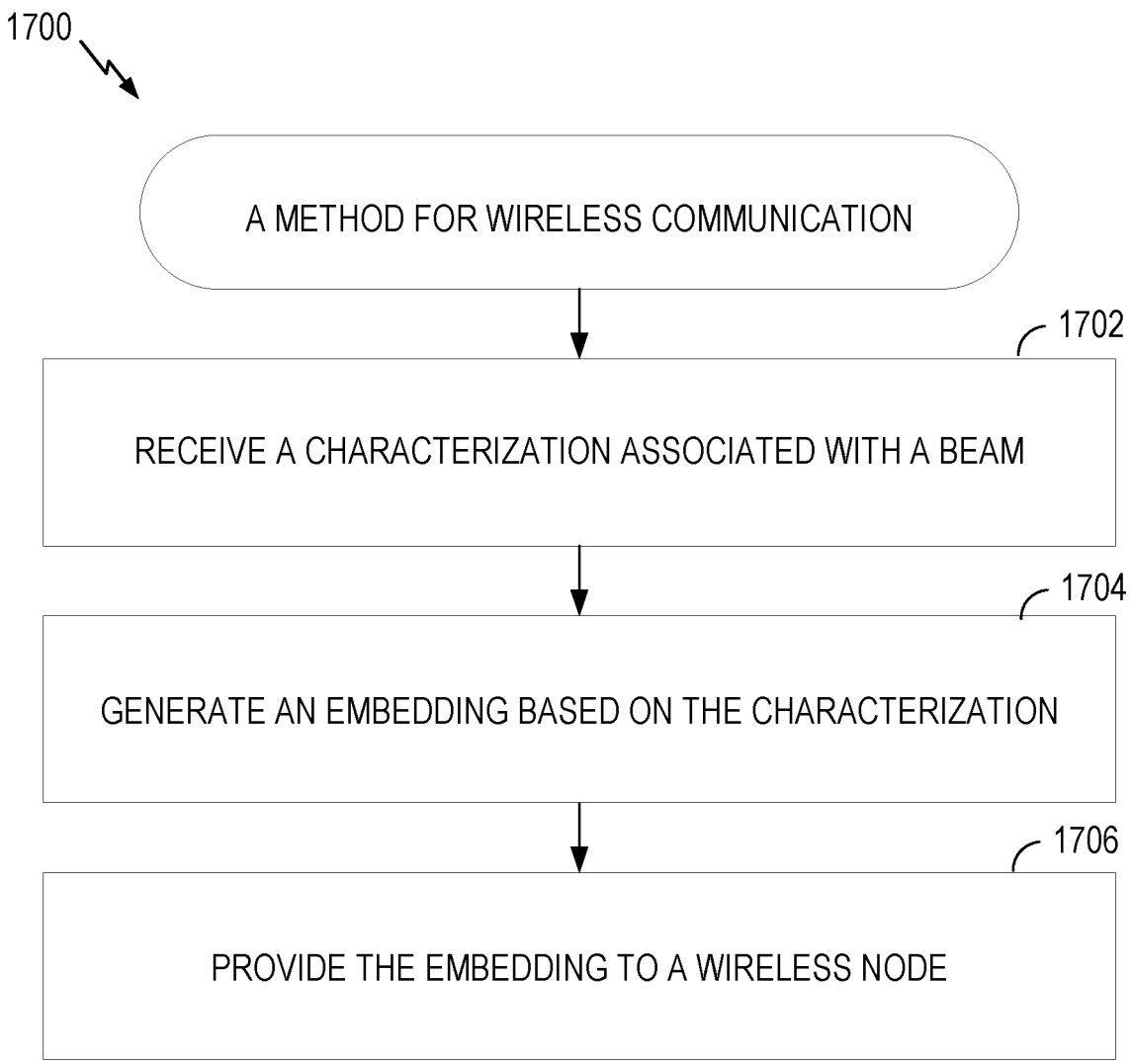
FIG. 17 is a flow diagram illustrating example operations for wireless communication by a network entity, in accordance with certain aspects of the present disclosure

FIG. 17 is a flow diagram illustrating example operations 1700 for wireless communication, in accordance with certain aspects of the present disclosure. The operations 1700 may be performed, for example, by a network entity, such as a BS (e.g., such as the BS 102 in the wireless communication network 100 of FIG. 1).

Operations 1700 may be implemented as software components that are executed and run on one or more processors (e.g., controller/processor 240 of FIG. 2). Further, the transmission and reception of signals by the BS in operations 1700 may be enabled, for example, by one or more antennas (e.g., antennas 234 of FIG. 2). In certain aspects, the transmission and/or reception of signals by the BS may be implemented via a bus interface of one or more processors (e.g., controller/processor 240 or training component 241 of FIG. 2) obtaining and/or outputting signals.

The operations 1700 begin, at block 1702, by the network entity receiving a characterization associated with a beam. The characterization may include a spherical array gain data, array gain measurements, or codebook beam characterization metrics, to name a few examples.

At block 1704, the network entity generates an embedding (e.g., embedding 503) based on the characterization. In some aspects, the characterization comprises a spherical array gain, and the network entity may convert the spherical array gain to a graph. The embedding may be generated using a graph convolution network based on the graph.

In some aspects, the network entity may receiving one or more training codebooks for training of an autoencoder. The embedding may be generated using an encoder of the autoencoder. In some aspects, the characterization is received as a noise augmented input (e.g., partially corrupted input 1104 of FIG. 11), and the embedding may be generated using a de-noising auto-encoder based on the noise augmented input (e.g., partially corrupted input 1104 of FIG. 11). In some aspects, generating the embedding may include down-sampling the characterization using a Fourier transform (e.g., at Fourier transform block 1204 of FIG. 12).

At block 1706, the network entity provides the embedding to a wireless node (e.g., a UE). For example, the network entity may provide a look-up table (e.g., look-up table 510) indicating the embedding.

Example Training Technique

In some aspects of the present disclosure, federated learning may be used to train an autoencoder, such as 590 of FIG. 5, implemented at the network. Federated learning is a framework that allows training of a model across multiple nodes that have local data samples without sharing such data across nodes but only the parameters of their local models. Federated learning involves using an iteration loop where an orchestrator (e.g., a BS) or central server chooses a model to be trained (e.g., model associated with autoencoder 590 of FIG. 5) and transmits the model to the nodes (e.g. UEs). The nodes train their local copy of the model with the local data. The orchestrator then pools the local models and generates one aggregated model to be transmitted to the nodes. The main benefit of this approach is privacy, as no UE-local data is shared across nodes or with the orchestrator.

In some aspects, a UE may send an embedding of its codebook to the BS for various use cases. For example, the embedding may be used for a model to be trained at the BS, or to be used with a pre-trained model to generate an inference that runs at the BS (e.g., either using uplink (UL) measurements or reported downlink (DL) measurements). Information on the codebook embedding may include information for mapping such input to the specific ML model. This provides an opportunity for the actual codebook design to remain proprietary while only a compressed version of it can be shared. These use cases can be combined with federated learning. A first set of UEs may receive an initial model and parameters. Such UE sets may train a model locally based on their codebook information and each UE may report back to the BS updated parameters with or without the UE codebook embedding associated with it. The BS may combine the parameters of these models with or without the respective UE codebook embeddings. The result will be a new model that the BS can send to a second set of UEs. This second set of UEs can possibly include the first set of UEs, in some scenarios. For instance, a set of UEs with higher capability can train locally a model, and the associated parameters can be reused by different UEs with lower capability. In the context of models that use Frequency Range 2 (FR2) (e.g., 26-41 GHz) beam measurements as their input, the codebook embedding provides an invariance to be able to leverage learning done by a set of UEs across other UEs. In other words, a codebook embedding may be derived such that the resulting encoder is codebook/UE independent. Once trained, an encoder trained based on FR2 beam measurements from one or more UEs can be used across any other UE operating on FR2. For a given ML model, UEs can communicate their capability, or lack thereof, to train the model locally and participate in the federated learning framework.

Example Wireless Communication Devices

Figure 18:
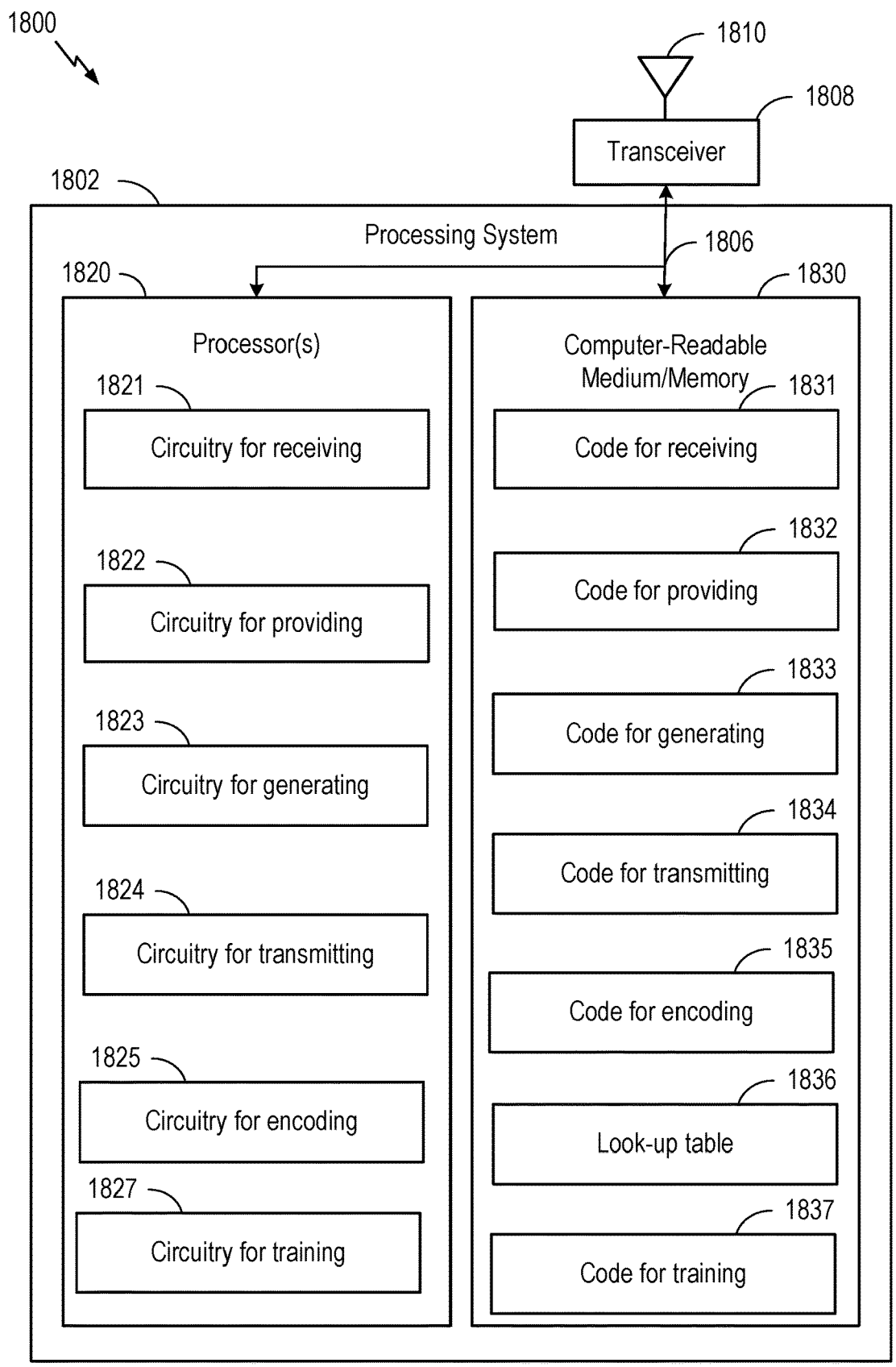
FIGS. 18 and 19 illustrate example electronic devices, in accordance with certain aspects of the present disclosure.

FIG. 18 depicts an example communications device 1800 that includes various components operable, configured, or adapted to perform operations for the techniques disclosed herein, such as the operations depicted and described with respect to FIG. 17. In some examples, communication device 1800 may be a base station 102 as described, for example with respect to FIGS. 1 and 2.

Communications device 1800 includes a processing system 1802 coupled to a transceiver 1808 (e.g., a transmitter and/or a receiver). Transceiver 1808 is configured to transmit (or send) and receive signals for the communications device 1800 via an antenna 1810, such as the various signals as described herein. Processing system 1802 may be configured to perform processing functions for communications device 1800, including processing signals received and/or to be transmitted by communications device 1800.

Processing system 1802 includes one or more processors 1820 coupled to a computer-readable medium/memory 1830 via a bus 1806. In certain aspects, computer-readable medium/memory 1830 is configured to store instructions (e.g., computer-executable code) that when executed by the one or more processors 1820, cause the one or more processors 1820 to perform the operations illustrated in FIG. 17, or other operations for performing the various techniques discussed herein for processing a characterization of a beam to generate an embedding.

In the depicted example, computer-readable medium/memory 1830 stores code 1831 for receiving, code 1832 for providing, code 1833 for generating, code 1834 for transmitting, code 1835 for encoding, and code 1837 for training. The code 1835 for encoding may be used to generate a look-up table 1836 stored in the computer-readable medium/memory 1830.

In the depicted example, the one or more processors 1820 include circuitry configured to implement the code stored in the computer-readable medium/memory 1830, including circuitry 1821 for receiving, circuitry 1822 for providing, circuitry 1823 for generating, circuitry 1824 for transmitting; circuitry 1825 for encoding, and circuitry 1826 for training. The circuitry 1825 for encoding may be used to generate a look-up table 1836 stored in the computer-readable medium/memory 1830.

Various components of communications device 1800 may provide means for performing the methods described herein, including with respect to FIG. 17.

In some examples, means for transmitting or sending (or means for outputting for transmission) may include the transceivers 232 and/or antenna(s) 234 of the base station 102 illustrated in FIG. 2 and/or transceiver 1808 and antenna 1810 of the communication device 1800 in FIG. 18.

In some examples, means for receiving (or means for obtaining) may include the transceivers 232 and/or antenna(s) 234 of the base station illustrated in FIG. 2 and/or transceiver 1808 and antenna 1810 of the communication device 1800 in FIG. 18.

In some examples, means for receiving, means for providing, means for generating, and means for transmitting may include various processing system components, such as: the one or more processors 1820 in FIG. 18, or aspects of the base station 102 depicted in FIG. 2, including receive processor 238, transmit processor 220, TX MIMO processor 230, and/or controller/processor 240 (including training component 241).

Notably, FIG. 18 is just use example, and many other examples and configurations of communication device 1800 are possible.

Figure 19:
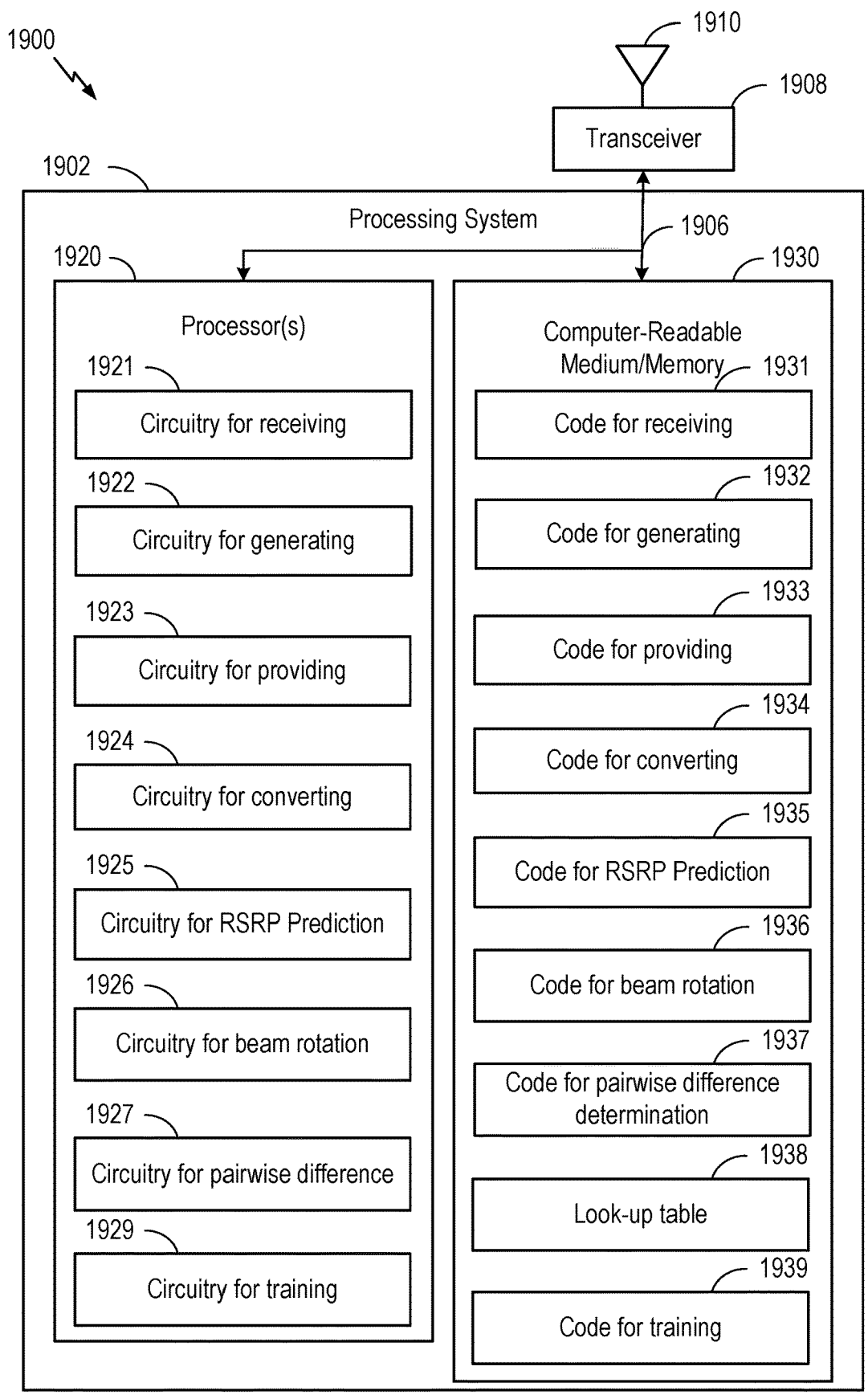

FIG. 19 depicts an example communications device 1900 that includes various components operable, configured, or adapted to perform operations for the techniques disclosed herein, such as the operations depicted and described with respect to FIG. 16. In some examples, communication device 1900 may be a user equipment 104 as described, for example with respect to FIGS. 1 and 2.

Communications device 1900 includes a processing system 1902 coupled to a transceiver 1908 (e.g., a transmitter and/or a receiver). Transceiver 1908 is configured to transmit (or send) and receive signals for the communications device 1900 via an antenna 1910, such as the various signals as described herein. Processing system 1902 may be configured to perform processing functions for communications device 1900, including processing signals received and/or to be transmitted by communications device 1900.

Processing system 1902 includes one or more processors 1920 coupled to a computer-readable medium/memory 1930 via a bus 1906. In certain aspects, computer-readable medium/memory 1930 is configured to store instructions (e.g., computer-executable code) that when executed by the one or more processors 1920, cause the one or more processors 1920 to perform the operations illustrated in FIG. 16, or other operations for performing the various techniques discussed herein for processing an embedding using machine learning for communication.

In the depicted example, computer-readable medium/memory 1930 stores code 1931 for receiving, code 1932 for generating, code 1933 for providing, code 1934 for converting; code for RSRP prediction 1935; code for beam rotation 1936; code 1937 for pairwise difference determination, and code 1939 for training. The code for RSRP prediction 1935; code for beam rotation 1936; and code 1937 for pairwise difference determination may be based on a look-up table 1938 stored in computer-readable medium/memory 1930.

In the depicted example, the one or more processors 1920 include circuitry configured to implement the code stored in the computer-readable medium/memory 1930, including circuitry 1921 for receiving, circuitry 1922 for generating, circuitry 1923 for providing, circuitry 1924 for converting, circuitry for RSRP prediction 1925, circuitry for beam rotation 1926, circuitry 1927 for pairwise difference determination, and circuitry 1929 for training. The circuitry for RSRP prediction 1925, circuitry for beam rotation 1926, and circuitry 1927 for pairwise difference determination may be based on the look-up table 1938 stored in computer-readable medium/memory 1930.

Various components of communications device 1900 may provide means for performing the methods described herein, including with respect to FIG. 16.

In some examples, means for transmitting or sending (or means for outputting for transmission) may include the transceivers 254 and/or antenna(s) 252 of the user equipment 104 illustrated in FIG. 2 and/or transceiver 1908 and antenna 1910 of the communication device 1900 in FIG. 19.

In some examples, means for receiving (or means for obtaining) may include the transceivers 254 and/or antenna(s) 252 of the user equipment 104 illustrated in FIG. 2 and/or transceiver 1908 and antenna 1910 of the communication device 1900 in FIG. 19.

In some examples, means for receiving, means for providing, means for generating, and means for providing may include various processing system components, such as: the one or more processors 1920 in FIG. 19, or aspects of the user equipment 104 depicted in FIG. 2, including receive processor 258, transmit processor 264, TX MIMO processor 266, and/or controller/processor 280 (including beam processing component 281).

Notably, FIG. 19 is just use example, and many other examples and configurations of communication device 1900 are possible.

Example Clauses

Implementation examples are described in the following numbered clauses:

Clause 1. A method for wireless communication by a wireless node, comprising: receiving an embedding representing a characterization associated with a beam; providing the embedding to a machine learning (ML) model; generating one or more communication parameters for communication using the beam via the ML model based on the embedding; and communicating using the one or more communication parameters.

Clause 2. The method of clause 1, wherein receiving the embedding comprises receiving a look-up table indicating the embedding.

Clause 3. The method of one of clauses 1-2, wherein: the ML model comprises a rotation transformer decoder; generating the one or more communication parameters comprises determining, via the rotation transformer decoder, a rotation of the beam for the communication based on the embedding; and the one or more communication parameters comprises a rotated beam in accordance with the determination.

Clause 4. The method of clause 3, further comprising providing a rotation instruction to the rotation transformer decoder, wherein the rotation of the beam is determined based on the rotation instruction.

Clause 5. The method of one of clauses 1-4, wherein: the method further comprises generating another embedding based on a characterization of another beam; the embedding and the other embedding are provided to a pointwise difference decoder; and generating the one or more communication parameters comprises predicting a pointwise difference between the beam and the other beam based on the embedding and the other embedding via the pointwise difference decoder.

Clause 6. The method of one of clauses 1-5, wherein: the embedding is provided to a reference signal receive power (RSRP) decoder; and generating the one or more communication parameters comprises determining, via the RSRP decoder, an RSRP for each of multiple synchronization signal blocks (SSBs) based on the embedding.

Clause 7. The method of clause 6, further comprising providing an indication of an orientation of the wireless node, wherein the RSRP is determined based on the orientation.

Clause 8. The method of one of clauses 1-7, wherein the characterization comprises a spherical array gain.

Clause 9. The method of one of clauses 1-8, wherein the characterization comprises array gain measurements or codebook beam characterization metrics.

Clause 10. The method of one of clauses 1-9, further comprising training an encoder configured to generate embeddings using the characterization associated with the beam.

Clause 11. A method for wireless communication, comprising: receiving a characterization associated with a beam; generating an embedding based on the characterization; and providing the embedding to a wireless node.

Clause 12. The method of clause 11, wherein providing the embedding comprises providing a look-up table indicating the embedding associated with the beam.

Clause 13. The method of one of clauses 11-12, wherein: the characterization comprises a spherical array gain; the method further comprises converting the spherical array gain to a graph; and the embedding is generated using a graph convolution network based on the graph.

Clause 14. The method of one of clauses 11-13, further comprising receiving one or more training codebooks for training of an autoencoder, wherein the embedding is generated using an encoder of the autoencoder.

Clause 15. The method of one of clauses 11-14, wherein the characterization comprises array gain measurements or codebook beam characterization metrics.

Clause 16. The method of clause 15, wherein the characterization is received as a noise augmented input, and wherein the embedding is generated using a de-noising auto-encoder based on the noise augmented input.

Clause 17. The method of one of clauses 11-16, wherein generating the embedding comprises down sampling the characterization using a Fourier transform.

Clause 18. The method of one of clauses 11-17, wherein the characterization comprises a spherical array gain.

Clause 19. The method of one of clauses 11-18, further comprising training an autoencoder using a federated learning model, wherein the embedding is generated using an encoder of the autoencoder.

Clause 20: An apparatus, comprising: a memory comprising executable instructions; one or more processors configured to execute the executable instructions and cause the apparatus to perform a method in accordance with any one of Clauses 1-19.

Clause 21: An apparatus, comprising means for performing a method in accordance with any one of Clauses 1-19.

Clause 23: A non-transitory computer-readable medium comprising executable instructions that, when executed by one or more processors of an apparatus, cause the apparatus to perform a method in accordance with any one of Clauses 1-19.

Clause 24: A computer program product embodied on a computer-readable storage medium comprising code for performing a method in accordance with any one of Clauses 1-19.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to YMHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway

168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of techniques for generation and processing of an embedding representing a beam in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a wireless node, comprising:
   receiving an embedding representing a characterization associated with a beam, wherein the characterization comprises array gain measurements or codebook beam characterization metrics;
   providing the embedding to a machine learning (ML) model;
   generating one or more communication parameters for communication using the beam via the ML model based on the embedding;
   communicating using the one or more communication parameters; and
   training an encoder configured to generate embeddings using the characterization associated with the beam.

2. The method of claim 1, wherein receiving the embedding comprises receiving a look-up table indicating the embedding.

3. The method of claim 1, wherein:
   the ML model comprises a rotation transformer decoder;
   generating the one or more communication parameters comprises determining, via the rotation transformer decoder, a rotation of the beam for the communication based on the embedding;
   the one or more communication parameters comprises a rotated beam in accordance with the determination; and
   the method further comprises providing a rotation instruction to the rotation transformer decoder wherein the rotation of the beam is determined based on the rotation instruction.

4. The method of claim 1, wherein:
   the method further comprises generating another embedding based on a characterization of another beam;
   the embedding and the other embedding are provided to a pointwise difference decoder; and
   generating the one or more communication parameters comprises predicting a pointwise difference between the beam and the other beam based on the embedding and the other embedding via the pointwise difference decoder.

5. The method of claim 1, wherein:
   the embedding is provided to a reference signal receive power (RSRP) decoder;
   generating the one or more communication parameters comprises determining, via the RSRP decoder, an RSRP for each of multiple synchronization signal blocks (SSBs) based on the embedding; and
   the method further comprises providing an indication of an orientation of the wireless node, wherein the RSRP is determined based on the orientation.

6. The method of claim 1, wherein the characterization comprises a spherical array gain.

7. The method of claim 1, wherein the array gain measurements correspond to array gain measurements per beam on a sphere, and the codebook beam characterization metrics correspond to codebook beam characterization metrics per beam as an auxiliary input for the embedding.

8. A method for wireless communication, comprising:
   receiving a characterization associated with a beam, wherein the characterization comprises array gain measurements or codebook beam characterization metrics;
   generating an embedding based on the characterization;
   providing the embedding to a wireless node; and
   training an autoencoder using a federated learning model, wherein the embedding is generated using an encoder of the autoencoder.

9. The method of claim 8, wherein providing the embedding comprises providing a look-up table indicating the embedding associated with the beam.

10. The method of claim 8, wherein:
    the characterization comprises a spherical array gain;
    the method further comprises converting the spherical array gain to a graph; and
    the embedding is generated using a graph convolution network based on the graph.

11. The method of claim 8, further comprising receiving one or more training codebooks for training of the autoencoder.

12. The method of claim 8, wherein the array gain measurements correspond to array gain measurements per beam on a sphere, and the codebook beam characterization metrics correspond to codebook beam characterization metrics per beam as an auxiliary input for the embedding, wherein the characterization is received as a noise augmented input, and wherein the embedding is generated using a de-noising auto-encoder based on the noise augmented input.

13. The method of claim 8, wherein generating the embedding comprises down sampling the characterization using a Fourier transform.

14. The method of claim 8, wherein the characterization comprises a spherical array gain.

15. An apparatus for wireless communication by a wireless node, comprising:
a memory comprising executable instructions; and
one or more processors configured to execute the executable instructions and cause the apparatus to:
receive an embedding representing a characterization associated with a beam, wherein the characterization comprises array gain measurements or codebook beam characterization metrics;
provide the embedding to a machine learning (ML) model;
generate one or more communication parameters for communication using the beam via the ML model based on the embedding;
communicate using the one or more communication parameters, and
train an encoder configured to generate embeddings using the characterization associated with the beam.

16. The apparatus of claim 15, wherein, in causing the apparatus to receive the embedding, the one or more processors are configured to cause the apparatus to receive a look-up table indicating the embedding.

17. The apparatus of claim 15, wherein:
the ML model comprises a rotation transformer decoder;
in causing the apparatus to generate the one or more communication parameters, the one or more processors are configured to cause the apparatus to determine, via the rotation transformer decoder, a rotation of the beam for the communication based on the embedding;
the one or more communication parameters comprises a rotated beam in accordance with the determination; and
the one or more processors are further configured to cause the apparatus to provide a rotation instruction to the rotation transformer decoder, wherein the rotation of the beam is determined based on the rotation instruction.

18. The apparatus of claim 15, wherein:
the one or more processors are further configured to cause the apparatus to:
generate another embedding based on a characterization of another beam; and
provide the embedding and the other embedding to a pointwise difference decoder; and
in causing the apparatus to generate the one or more communication parameters, the one or more processors are configured to cause the apparatus to predict a pointwise difference between the beam and the other beam based on the embedding and the other embedding via the pointwise difference decoder.

19. The apparatus of claim 15, wherein:
the one or more processors are further configured to cause the apparatus to provide the embedding to a reference signal receive power (RSRP) decoder;
in causing the apparatus to generate the one or more communication parameters, the one or more processors are configured to cause the apparatus to determine, via the RSRP decoder, an RSRP for each of multiple synchronization signal blocks (SSBs) based on the embedding; and
the one or more processors are further configured to cause the apparatus to provide an indication of an orientation of the wireless node, wherein the RSRP is determined based on the orientation.

20. The apparatus of claim 15, wherein the characterization comprises a spherical array gain.

21. The apparatus of claim 15, wherein the array gain measurements correspond to array gain measurements per beam on a sphere, and the codebook beam characterization metrics correspond to codebook beam characterization metrics per beam as an auxiliary input for the embedding.

22. An apparatus for wireless communication, comprising:
a memory comprising executable instructions; and
one or more processors configured to execute the executable instructions and cause the apparatus to:
receive a characterization associated with a beam, wherein the characterization comprises array gain measurements or codebook beam characterization metrics;
generate an embedding based on the characterization;
provide the embedding to a wireless node, and
train an autoencoder using a federated learning model,
wherein to generate the embedding the one or more processors are configured to cause the apparatus to generate the embedding using an encoder of the autoencoder.

23. The apparatus of claim 22, wherein in causing the apparatus to provide the embedding, the one or more processors are configured to cause the apparatus to provide a look-up table indicating the embedding associated with the beam.

24. The apparatus of claim 22, wherein:
the characterization comprises a spherical array gain;
the one or more processors are further configured to cause the apparatus to convert the spherical array gain to a graph; and
in causing the apparatus to generate the embedding, the one or more processors are configured to cause the apparatus to generate the embedding using a graph convolution network based on the graph.

25. The apparatus of claim 22, wherein the one or more processors are further configured to cause the apparatus to receive one or more training codebooks for training of the autoencoder.

26. The apparatus of claim 22, wherein the array gain measurements correspond to array gain measurements per beam on a sphere, and the codebook beam characterization metrics correspond to codebook beam characterization metrics per beam as an auxiliary input for the embedding,
wherein in causing the apparatus to receive the characterization, the one or more processors are configured to cause the apparatus to receive the characterization as a noise augmented input, and
wherein in causing the apparatus to generate the embedding, the one or more processors are configured to cause the apparatus to generate the embedding using a de-noising auto-encoder based on the noise augmented input.

27. The apparatus of claim 22, wherein in causing the apparatus to generate the embedding, the one or more processors are configured to cause the apparatus to down sample the characterization using a Fourier transform.

28. The apparatus of claim 22, wherein the characterization comprises a spherical array gain.

* * * * *